United States Patent
Yao et al.

(10) Patent No.: US 12,452,791 B2
(45) Date of Patent: Oct. 21, 2025

(54) POWER CONTROL PARAMETER DETERMINATION METHOD AND DEVICE, AND STORAGE MEDIUM

(71) Applicant: ZTE Corporation, Guangdong (CN)

(72) Inventors: Ke Yao, Guangdong (CN); Bo Gao, Guangdong (CN); Chuangxin Jiang, Guangdong (CN); Zhaohua Lu, Guangdong (CN); Zhen He, Guangdong (CN)

(73) Assignee: ZTE Corporation, Shenzhen (CN)

( * ) Notice: Subject to any disclaimer, the term of this patent is extended or adjusted under 35 U.S.C. 154(b) by 307 days.

(21) Appl. No.: 17/870,584

(22) Filed: Jul. 21, 2022

(65) Prior Publication Data
US 2023/0028861 A1  Jan. 26, 2023

Related U.S. Application Data

(63) Continuation of application No. PCT/CN2021/072995, filed on Jan. 21, 2021.

(30) Foreign Application Priority Data

Jan. 21, 2020  (CN) .......................... 202010072006.5

(51) Int. Cl.
*H04W 52/14* (2009.01)
*H04W 16/28* (2009.01)
(Continued)

(52) U.S. Cl.
CPC ......... *H04W 52/146* (2013.01); *H04W 16/28* (2013.01); *H04W 52/08* (2013.01); *H04W 52/242* (2013.01)

(58) Field of Classification Search
CPC ... H04W 52/146; H04W 16/28; H04W 52/08; H04W 52/242
See application file for complete search history.

(56) References Cited

U.S. PATENT DOCUMENTS

2018/0014254 A1  1/2018  Hwang et al.
2018/0376430 A1  12/2018  Liu
(Continued)

FOREIGN PATENT DOCUMENTS

CN  110035484 A  7/2019
CN  110167126 A  8/2019
(Continued)

OTHER PUBLICATIONS

International Search Report and Written Opinion International Application No. PCT/CN2021/072995 mailed on Apr. 12, 2021 (9 pages).
(Continued)

*Primary Examiner* — Kevin M Cunningham
(74) *Attorney, Agent, or Firm* — Perkins Coie LLP

(57) ABSTRACT

Provided are a method and device for determining a power control parameter, and storage medium. The method includes: determining a beam state of an uplink transmission; and determining, based on the beam state, the power control parameter of the uplink transmission, where the beam state at least includes one of the following: a QCL state, a TCL state, spatial relation information, reference signal information, spatial filter information or precoding information.

19 Claims, 4 Drawing Sheets

Determine a beam state of an uplink transmission — S110

Determine, based on the beam state, a power control parameter of the uplink transmission — S120

(51) Int. Cl.
H04W 52/08 (2009.01)
H04W 52/24 (2009.01)

(56) References Cited

U.S. PATENT DOCUMENTS

| 2021/0007063 | A1 | 1/2021 | Yao et al. | |
| 2021/0195530 | A1* | 6/2021 | Venugopal | H04W 52/32 |
| 2022/0239440 | A1* | 7/2022 | Go | H04L 5/0091 |
| 2022/0345272 | A1* | 10/2022 | Guo | H04W 72/20 |

FOREIGN PATENT DOCUMENTS

| CN | 111901020 A | 11/2020 |
| WO | 2019067014 A1 | 4/2019 |
| WO | 2019157895 A1 | 8/2019 |

OTHER PUBLICATIONS

Vivo, "Discussion on Enhancements on Multi-Beam Operation", 3GPP TSG RAN WG1 Meeting #95, Spokane, USA, R1-1812324, 10 pages, Nov. 12-16, 2018.
European Search Report issued in EP Patent Application No. 21743731.8, dated on Dec. 18, 2023, 10 pages.

* cited by examiner

POWER CONTROL PARAMETER DETERMINATION METHOD AND DEVICE, AND STORAGE MEDIUM This application is a Bypass Continuation Application of International Patent Application PCT/CN2021/072995, filed on Jan. 21, 2021, which claims priority to Chinese patent application No. 202010072006.5 filed with the China National Intellectual Property Administration on Jan. 21, 2020, and the entire contents of each of which are incorporated herein by reference.

FIELD

The present application relates to communication, for example, a method and device for determining a power control parameter, and a storage medium.

BACKGROUND

One of the characteristics of the New Radio (NR) technology of the $5^{th}$ generation mobile communication system is to support high frequency bands. Although the high frequency band has abundant frequency domain resources, there is a problem that the wireless signal decays rapidly, causing a small coverage. If beams are used to transmit signals, energy may be concentrated in a relatively small spatial range, and the coverage of high-frequency signals may be improved accordingly. In a beam scenario, the beam pair between a base station and the User Equipment (UE) may be varied with changes in the time and locations, and thus there is a need for a flexible beam update mechanism. In the unified beam mechanism, how to provide a flexible and efficient power control parameter for an uplink transmission is an urgent problem to be solved.

SUMMARY

According to embodiments of the present application, there are provided a method and device for determining a power control parameter, and a storage medium, to provide an efficient power control parameter for an uplink transmission.

According to embodiments of the present application, there is provided a method for determining a power control parameter applied at a first communication node, the method including: determining a beam state of an uplink transmission; and determining, based on the beam state, the power control parameter of the uplink transmission, and the beam state at least includes one of the following: a Quasi Co-Location (QCL) state, a Transmission Configuration Indication (TCI) state, spatial relation information, reference signal information, spatial filter information, or precoding information.

According to embodiments of the present application, there is also provided a method for determining a power control parameter applied at a second communication node, the method including: configuring or activating a specific beam state set; and configuring or indicating a beam state associated with an uplink transmission, the beam state associated with the uplink transmission being used to determine the power control parameter of the uplink transmission, and the beam state at least includes one beam state in the specific beam state set; and the beam state at least includes one of the following: a Quasi Co-Location (QCL) state, a Transmission Configuration Indication (TCI) state, spatial relation information, reference signal information, spatial filter information, or precoding information.

According to embodiments of the present application, there is further provided an apparatus for determining a power control parameter applied at a first communication node, the apparatus including: a first determining module configured to determine a beam state of an uplink transmission; and a second determining module configured to determine, based on the beam state, the power control parameter of the uplink transmission, and the beam state at least includes one of the following: a Quasi Co-Location (QCL) state, a Transmission Configuration Indication (TCI) state, spatial relation information, reference signal information, spatial filter information, or precoding information.

According to embodiments of the present application, there is further provided an apparatus for determining a power control parameter applied at a second communication node, the apparatus including: a first configuring module configured to configure or activate a specific beam state set; and a second configuring module configured to configure or indicate a beam state associated with an uplink transmission, the beam state associated with the uplink transmission being used to determine the power control parameter of the uplink transmission, and the beam state associated with the uplink transmission includes: at least one beam state in the specific beam state set, and the beam state at least includes one of the following: a Quasi Co-Location (QCL) state, a Transmission Configuration Indication (TCI) state, spatial relation information, reference signal information, spatial filter information, or precoding information.

According to embodiments of the present application, there is further provided a device, including: a memory, and at least one processor; the memory being configured to store at least one program, the at least one program, when executed by the at least one processor, causing the at least one processor to implement the method of any one of the above embodiments.

According to embodiments of the present application, there is further provided a storage medium storing thereon a computer program which, when executed by a processor, implements the method of any one of the above embodiments.

DETAILED DESCRIPTION OF EMBODIMENTS

Figure 1:
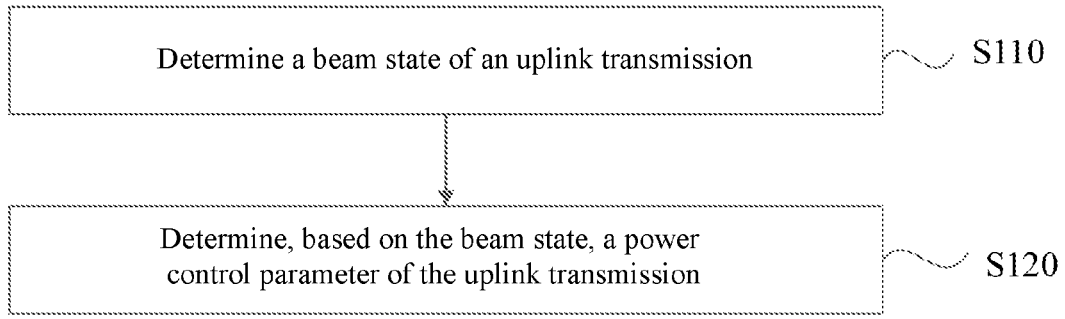
FIG. 1 illustrates a flowchart of a method for determining a power control parameter according to embodiments of the present application.

Reference now will be made to the drawings to illustrate embodiments of the present application.

In some embodiments, a beam state is equivalent to the following parameters in concept, i.e., the beam state in the embodiments is replaceable with one of the following parameters: a Quasi Co-Location (QCL) state, a Transmission Configuration Indication (TCI), spatial relation information, Reference Sign (RS) information, spatial filter information, or precoding information. In some embodiments, beam state may also be referred to as beam.

In some embodiments, a beam may be a resource or transmission (transmitting or receiving) manner. In some embodiments, resources include, for example, transmitter precoding, receiver precoding, antenna ports, antenna weight vectors, antenna weight matrices, and the like. The transmission manner may include space division multiplexing, frequency/time domain diversity, and the like. A beam indication refers to that a transmitter can indicate that a QCL state is satisfied by comparing a current reference signal and an antenna port with a reference signal (or reference parameter signal) scanned by the base station or reported by the UE and the antenna port.

Transmitting beam is equivalent to the following parameter in concept, including: a QCL state, a TCI state, a spatial relation state, a DownLink (DL) Reference Signal (RS) or an UpLink (UL) Reference Signal (RS), a RS resource, a transmitting spatial filter or transmitting precoding. Receiving beam is equivalent to the following parameter in concept, including: a QCL state, a TCI state, a spatial relation state, a downlink RS or a uplink RS, a RS resource, a receiving spatial filter or receiving precoding.

Beam index is equivalent to the following parameter in concept, including: QCL state index, TCI state index, spatial relation state index, RS index, RS resource index, spatial filter index, or precoding index. An index may also be referred to as an index, or an Identifier (ID).

A DownLink (DL) RS includes a Channel State Information Reference Signal (CSI-RS), a Synchronization Signal Block (SSB) (also referred to as SS/PBCH), or a DeModulation Reference Signal (DMRS). An UpLink (UL) RS includes: a Sounding Reference Signal (SRS), or a Physical Random Access Channel (PRACH).

A spatial filter may also be referred to as a space domain filter, which may be at a UE side, or may be at a base station side (gNB) or network side.

Spatial relation information includes one or more reference RSs, for describing an identical or quasi identical spatial relation between a target RS or channel and the one more one or more reference RSs.

A spatial relation refers to a beam, a spatial parameter, or a space domain filter.

A QCL state includes one or more reference RSs and parameters of a QCL type corresponding to the references RSs. A parameter of a QCL type includes at least one of the following: a type A, a type B, a type C, or a type D. Different types are used to differentiate different QCL parameters. QCL parameters include at least one of the following or a combination thereof: a Doppler spread, a Doppler frequency shift, a delay spread, an average delay, an average gain, or a spatial parameter.

In some embodiments of the present application, the TCI state is equivalent to a QCL state. The type D of QCL is equivalent to a spatial parameter or a spatial receiving parameter.

An uplink signal includes at least one of the following: a Physical Uplink Control Channel (PUCCH), a Physical Uplink Shared Channel (PUSCH), a Sounding Reference Signal (SRS), or a PRACH.

A downlink signal includes at least one of the following: a Physical Downlink Control Channel (PDCCH), a Physical Downlink Shared Channel (PDSCH), or a CSI-RS.

In some embodiments of the present application, a time unit includes at least one of the following: a subsymbol, a symbol, a slot, a subframe, a frame, or a transmission occasion.

In some embodiments of the present application, the power control parameter include at least one of the following: a target power (also referred to as P0, or target received power), a path-loss) RS, a path-loss coefficient (also referred to as alpha, or a path-loss compensation factor or a path-loss compensation coefficient), or a closed loop process (a closed loop power control process, or a closed loop power control loop).

In some embodiments of the present application, Radio Resource Control (RRC) signaling is equivalent to higher layer signaling. Media Access Control (MAC) signaling is equivalent to MAC layer signaling, or MAC Control Element (CE).

In some embodiments of the present application, DCI is equivalent to DCI information, or a PDCCH transmission carrying DCI.

In one embodiment, FIG. 1 illustrates a flowchart of a method for determining a power control parameter according to embodiments of the present application. The present embodiment is applied at a first communication node. Exemplarily, the first communication node may be an UE. As shown therein, this embodiment includes S110-S120.

At S110, a beam state of an uplink transmission is determined.

In some embodiments, the uplink transmission at least includes one of the following: a Physical Uplink Shared Channel (PUSCH) transmission, a PUCCH transmission, an SRS transmission, or a PRACH transmission. The beam state at least includes one of the following: a QCI state, a TCI state, spatial relation information, reference signal information, spatial filter information, or precoding information.

At S120, the power control parameter of the uplink transmission is determined based on the beam state.

In some embodiments, the power control parameter at least includes at least one of the following: a path-loss measurement parameter, a target received power, a path-loss compensation factor, or a closed loop power control parameter. The power control parameter includes a power control parameter for determining at least one of the following: a PUSCH transmission, a PUCCH transmission, an SRS transmission, or a PRACH transmission.

In one embodiment, the beam state includes at least one beam state.

In one embodiment, the beam state is indicated by information of at least one of the following: an index of at least one beam state in a specific beam state set, an index of at least one beam state in activated beams states in the specific beam state set, a combined index of at least one beam state in the specific beam state set, or a combined index of at least one beam state in activated beam states in the specific beam state set.

The specific beam state set is configured or activated by higher layer signaling and/or MAC layer signaling.

In some embodiments, a specific beam state set includes: a basic beam state set. The basic beam state set includes at least one of the following features: the basic beam state set including at least one beam state, the basic beam state set being configured or reconfigured through higher layer signaling, or the basic beam state set being used to determine a transmission parameter of at least one of the following channels or signals: a PDCCH, a PDSCH, a Channel State Information Reference Signal (CSI-RS), a PUSCH, a PUCCH, or an SRS. Alternatively, a specific beam state set includes: a first beam state set. The first beam state set includes at least one of the following features: the first beam state set including at least one beam state in a basic beam state set, beam states in the first beam state set being configured or reconfigured through higher layer signaling, or being activated by MAC signaling; or the first beam state set being used to determine a transmission parameter of at least one of the following channels or signals: a PUSCH, a PUCCH, or an SRS. The basic beam state set includes at least one of the following features: the basic beam state set including at least a beam state, the basic beam state set being configured or reconfigured through higher layer signaling, the basic beam state set being used to determine transmission signals of at least one of the following channels or signals: a PDCCH, a PDSCH, a Channel State Information Reference Signal (CSI-RS), a PUSCH, a PUCCH, or an SRS. Alternatively, a specific beam state set includes: a second beam state set, where the second beams state set includes at least one of the following features: the second beam state set including at least one beam state in the first beam state set, beam states in the second beam state set being activated through MAC signaling, or the second beam state set being used to determine a transmission parameter of at least one of the following: a PUSCH, a PUCCH, or an SRS. The first beam state set includes at least one of the following features: the first beam state set including at least one beam state in a basic beam state set, beam states in the first beam state set being configured or reconfigured through higher layer signaling, or activated through MAC signal, the first beam state being used to determine a transmission parameter of at least one of the following channels or signals: a PUSCH, a PUCCH, or an SRS, the basic beam state set including at least one of the following features: the basic beam state set including at least one beam state, the basic beam state set being configured or reconfigured through higher layer signaling, or the basic beam state set being used to determine a transmission parameter of at least one of the following channels or signals: a PDCCH, a PDSCH, a Channel State Information Reference Signal (CSI-RS), a PUSCH, a PUCCH, or an SRS.

In one embodiment, a beam state of an uplink transmission includes at least one of the following: a beam state referenced by the uplink transmission, a beam state associated with the uplink transmission, a beam state indicated by Downlink Control Information (DCI) scheduling or triggering the uplink transmission, a beam state configured by the higher layer signaling for the uplink transmission, or a beam state associated with a resource of the uplink transmission.

In some embodiments, the beam state of the uplink transmission is determined by DCI information scheduling or triggering the uplink transmission. In some embodiments, the DCI information indicates an index of the beam state in a beam state set activated by a MAC CE or in a beam state set configured/reconfigured through higher layer signaling.

A beam state of a periodic uplink transmission is determined by higher layer signaling. The higher layer signaling indicates an index of a beam state of the periodic uplink transmission that is an index of the beam state in a beam state set activated by a MAC CE or in a beam state configured/reconfigured through higher layer signaling.

In some embodiments, the beam state of the uplink transmission is determined by a beam state associated with a resource of the uplink transmission. In some embodiments, the resource of the uplink transmission is determined by the DCI information scheduling or activating the uplink transmission, and an association between the resource of the uplink transmission and the beam state is determined by higher layer signaling and/or MAC signaling.

In one embodiment, determining the power control parameter of the uplink transmission based on the beam state includes at least one of the following: determining the power control parameter of the uplink transmission based on the power control parameter or an index of the power control parameter included in the beam state, or determining the power control parameter of the uplink transmission, based on an association relation between the beam state and the power control parameter.

In one embodiment, the association between the beam state and the power control parameter includes an association element between at least one beam state and the power control parameter, and an association element between the beam state and a power control parameter includes at least one of the following: an index of the association element between the beam state and the power control parameter, the beam state, or the power control parameter. In some embodiments, the association between the beam state and the power control parameter includes: a power control parameter included in the beam state, a beam state included in the power control parameter, and an association between an index of the beam state and an index of the power control parameter.

In one embodiment, the power control parameter at least includes at least one of the following: a path-loss measurement parameter, a target received power, a path-loss compensation factor, or a closed loop power control parameter.

In one embodiment, if the uplink transmission is a PUSCH transmission, or the beam state is used for a PUSCH transmission, the power control parameter at least includes at least one of the following: a path-loss measurement parameter of the PUSCH, a target received power of the PUSCH, a path-loss compensation factor of the PUSCH, or a closed-loop power control parameter of the PUSCH.

If the uplink transmission is a PUCCH transmission, or the beam state is used for a PUCCH transmission, the power control parameter at least includes at least one of the following: a path-loss measurement parameter of the PUCCH, a target received power of the PUCCH, or a closed loop power control parameter of the PUCCH.

If the uplink transmission is an SRS transmission, or the beam state is used for an SRS transmission, the power control parameter at least includes at least one of the following: a path-loss measurement parameter of an SRS, a target received power of the SRS, or a closed loop power control parameter of the SRS.

If the beam state is used for a PUSCH transmission and a PUCCH transmission, the power control parameter at least includes at least one of the following: a path-loss measurement parameter, a target received power of a PUSCH, a path-loss compensation factor of the PUSCH, a closed loop power control parameter of the PUSCH, a target received power of the PUCCH, or a closed loop power control parameter of the PUCCH.

Alternatively, if the beam state is used for a PUSCH transmission, a PUCCH transmission, and an SRS transmission, the power control parameter at least includes at least one of the following: a path-loss measurement parameter, a target received power of a PUSCH, a path-loss compensation factor of the PUSCH, a closed loop power control parameter of the PUSCH, a target received power of a PUCCH, a closed loop power control parameter of the PUCCH, a target received power of an SRS, or a closed loop power control parameter of the SRS.

In some embodiments, the power control parameter may be represented by an index of a power control parameter, and the index of power control parameter is an index of the power control parameter in a predetermined power control parameter set.

In one embodiment, a characteristic of a beam state includes at least one of the following: a beam state configured or associated with an SRS resource; a beam state for an uplink transmission; or a beam state non-dedicated for a downlink transmission.

For example, a beam state for an uplink transmission, a beam state non-dedicated for a downlink transmission, and/or a beam state configured or associated with an SRS resource have an association with the power control parameter.

In some embodiments, the beam state for the uplink transmission, the beam state non-dedicated for the downlink transmission, and/or the beam state configured and associated with the SRS resource in the beam state set have an association with the power control parameter.

In some embodiments, the beam state configured or associated with the SRS resource has an association with a power control parameter of the PUSCH.

In some embodiments, the beam state for the uplink transmission has an association with a power control parameter of the PUSCH, a power control parameter of the PUCCH, and/or a power control parameter of the SRS.

In one embodiment, if the beam state is used for a PUSCH transmission, the beam state is configured or associated with an SRS resource. In some embodiments, the beam state being applied to the PUSCH transmission includes: the beam state being used to determine a transmitting approach of the PUSCH transmission, such as transmitting a beam.

In one embodiment, a path-loss measurement parameter included in or associated with a beam state is used to determine a path-loss measurement parameter of at least one of the following uplink transmissions: a PUSCH transmission, a PUCCH transmission, an SRS transmission, or a PRACH transmission. In some embodiments, if a beam state associated with one PUSCH transmission is identical to a beam state associated with one PUCCH transmission, the path-loss measurement parameter associated with the beam state can not only be used to determine the path-loss measurement parameter of the PUSCH transmission, but also may be used to determine the path loss measurement parameter of the PUCCH transmission.

In one embodiment, a path-loss measurement parameter associated with a beam state is determined based on a Reference Signal (RS) in the beam state; or if the beam state is not configured or provided with a path-loss measurement parameter, the path-loss measurement parameter associated with the beam state is determined by an RS in the beam state. In some embodiments, the RS in the beam state includes: an RS included in QCL information of the beam state. In some embodiments, the RS included in the QCL information of the beam state may include one of the following: a downlink RS included in the QCL information of the beam state, a periodic RS included in the QCL information of the beam state, or a semi-persistent RS included in the QCL information of the beam state. In some embodiments, the downlink RS includes: an SSB or CSI-RS, and the periodic RS includes: an SSB or periodic CSI-RS, and the semi-persistent RS includes: a semi-persistent CSI-RS.

In one embodiment, an RS in a beam state has at least one of the following characteristics: a downlink RS, a periodic RS, a semi-persistent RS, an RS of a first QCL type, or an RS of a second QCL type. In some embodiments, the first QCL type includes one of the following: a type A, a type B, a type C, or a QCL type corresponding to a QCL parameter other than a spatial parameter, or a second QCL type includes one of the following: a type D, or a QCL type corresponding to a spatial parameter.

In one embodiment, determining the path-loss measurement parameter associated with the beam state based on a Reference Signal (RS) in the beam state includes at least one of the following: if the beam state includes an RS of the second QCL type, determining the path-loss measurement parameter associated with the beam state based on the RS of the second QCL type included in the beam state, and if the beam state does not include the RS of the second QCL type, determining the path-loss measurement parameter associated with the beam state based on the RS of the first QCL type included in the beam state, and if the uplink transmission is in a Frequency Range (FR) 1, determining the path-loss measurement parameter associated with the beam state based on the RS of the first QCL type included in the beam state. In some embodiments, the Frequency Range FR 1 refers to a spectrum range less than or equal to a predetermined frequency. An FR 2 refers to a spectrum range greater than the predetermined frequency. For example, the predetermined frequency is 6 GHz or 7 GHz.

In one embodiment, if the beam state is not configured or provided with a path-loss measurement parameter, the path-loss measurement parameter associated with the beam state is determined by at least one of the following: a path-loss measurement parameter of a cell where the uplink transmission is located or a cell having a lowest index in cells configured for the first communication node, a path-loss measurement parameter of a BandWidth Part (BWP) where the uplink transmission is located, an activated BWP in the cell where the uplink transmission is located, or a BWP having a lowest BWP index in the cell where the uplink transmission is located, or a path-loss measurement parameter determined based on a Control Resource Set (CORESET). In some embodiments, the higher layer signaling is a path-loss measurement parameter of a cell where the uplink transmission is located, or a cell having a lowest index in cells configured for the first communication node. In one embodiment, the higher layer signaling is a path-loss measurement parameter of a BWP where the uplink transmission is located, an activated BWP in a cell where the uplink transmission is located, or a BWP having a lowest BWP index in a cell where the uplink transmission is located.

In one embodiment, determining a beam state associated with the uplink transmission includes: determining a beam state associated with the uplink transmission based on indication information of the beam state.

In one embodiment, a correspondence between the indication information of the beam state and a beam state in the specific beam state set is determined in a predefined manner, or a correspondence between the indication information of the beam state and a beam state in the specific beam state set is determined through higher layer signaling or MAC signaling, or if the uplink transmission is a non-codebook based transmission, a correspondence between the indication information of the beam state and a beam state in the specific beam state set is determined through higher layer signaling or MAC signaling.

In one embodiment, determining the power control parameter of the uplink transmission includes at least one of the following: determining a corresponding set of power control parameters based on a value of indication information of each beam state, or determining a set of power control parameters based on a beam state indicated by the indication formation of the beam state.

In one embodiment, the corresponding set of power control parameters is determined based on the value of the indication information of each beam state in a case that at least one of the following conditions is met: the uplink transmission being a non-codebook based transmission, the beam state being associated with at least one SRS resource, or the number of ports of an SRS resource associated with the beam state being equal to 1.

In one embodiment, the set of power control parameters is determined based on the beam state indicated by the indication information of the beam state in a case that at least one of the following conditions is met: the uplink transmission being a codebook based transmission, the beam state being associated with one SRS resource, or the number of ports of an SRS resource associated with the beam state being greater than or equal to 1.

Figure 2:
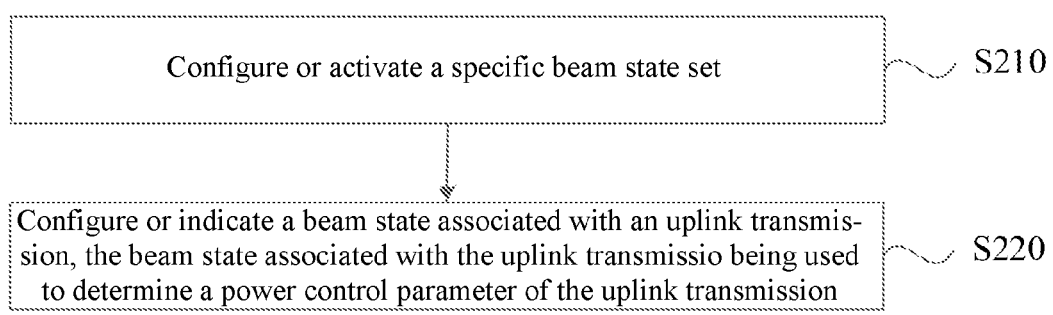
FIG. 2 illustrates a flowchart of another method for determining a power control parameter according to embodiments of the present application.

FIG. 2 illustrates a flowchart of another method for determining a power control parameter according to an embodiment of the present application. The present embodiment is applied at a second communication node. As shown in FIG. 2, this embodiment includes S210-S220.

At S210, a specific beam state set is configured or activated.

At S220, a beam state associated with an uplink transmission is configured or indicated, which is used to determine a power control parameter of the uplink transmission.

In some embodiments, the beam state associated with the uplink transmission includes: at least one beam state in the specific beam state set.

The beam state at least includes one of the following: a QCL state, a TCI state, spatial relation information, reference signal information, spatial filter information, or precoding information.

In one embodiment, the uplink transmission includes at least one of the following: a PUSCH transmission, a PUCCH transmission, an SRS transmission, or a PRACH transmission.

In one embodiment, a path-loss measurement parameter included in or associated with the beam state is used to determine a path-loss measurement parameter of at least one of the following uplink transmissions: a PUSCH transmission, a PUCCH transmission, an SRS transmission, or a PRACH transmission.

In one embodiment, the specific beam state set includes: a basic beam state set, where the basic beam state set includes at least one of the following features: the basic beam state set including at least one beam state, the basic beam state set being configured or reconfigured through higher layer signaling, or the basic beam state set being used to determine a transmission parameter of at least one of the following channels or signals: a PDCCH, a PDSCH, a Channel State Information Reference Signal (CSI-RS), a PUSCH, a PUCCH, or an SRS.

In one embodiment, the specific beam state set includes: a first beam state set, where the first beam state set includes at least one of the following features: the first beam state set including at least one beam state in a basic beam state set, a beam state of the first beam set being configured or reconfigured through higher layer signaling, or being activated through MAC signaling, or the first beam state set being used to determine a transmission parameter of at least one of the following channels or signals: a PUSCH, a PUCCH, or an SRS, and where the basic beam state set includes at least one of the following features: the basic beam state set including at least one beam state, the basic beam state set being configured or reconfigured through higher layer signaling, or the basic beam state set being used to determine a transmission parameter of at least one of the following channels or signals: a PDCCH, a PDSCH, a Channel State Information Reference Signal (CSI-RS), a PUSCH, a PUCCH, or an SRS.

In one embodiment, the specific beam state set includes: a second beam state set, and the second beam state set includes at least one of the following features: the second beam state set including at least one beam state in a first beam state set, a beam state of the second beam state set being activated through MAC signaling, or the second beam state set being used to determine a transmission parameter of at least one of the following: a PUSCH, a PUCCH, and or SRS, the first beam state set including at least one of the following features: the first beam state set including at least one beam state in a basic beam state set; a beam state of the first beam state set being configured or reconfigured through higher layer signaling, or activated through MAC signaling, the first beam state set being used to determine transmission signals of at least one of the following channels or signals: a PUSCH, a PUCCH, or an SRS, and the basic beam state set includes at least one of the following features: the basic beam state set including at least one beam state, the basic beam state set being configured or reconfigured through higher layer signaling, or the basic beam state set being used to determine a transmission parameter of at least one of the following channels or signals: a PDCCH, a PDSCH, a Channel State Information Reference Signal (CSI-RS), a PUSCH, a PUCCH, or an SRS. In some embodiments, determining a transmission parameter of the above channel and/or signal includes: determining a transmission parameter of the channel, and/or a transmitting or receiving parameter of the channel, such as a transmitting/receiving beam, a spatial relation, a reference signal in use, a transmitting/receiving filter, precoding, and the like.

In one embodiment, a first beam state set includes at least one beam state in the basic beam state set, and is configured or reconfigured through high level signaling. In some embodiments, the beam states included in the first beam state set are a subset of the basic beam state set, which may be activated through MAC signaling. The activated beam states in the first beam state set are a subset of the basic beam state set.

In one embodiment, determining a power control parameter of the uplink transmission using the beam state associated with the uplink transmission includes one of the following: determining the power control parameter of the uplink transmission based on the power control parameter or an index of the power control parameter included in the beam state, or determining the power control parameter of the uplink transmission based on an association between the beam state and the power control parameter.

In one embodiment, the association between the beam state and the power control parameter incudes: an association element between at least one beam state and the power control parameter, and an association element between the beam state and a power control parameter at least includes one of the following: an index of the association element between the beam state and the power control parameter, the beam state, or the power control parameter.

In one embodiment, the beam state is indicated by information of one of the following: an index the beam state; or a combined index of the beam state.

In one embodiment, the association between the beam state and the power control parameter includes one of the following: at least one beam state in the specific beam state set being configured to associate with the power control parameter through higher layer signaling or Media Access Control, MAC, signaling, or each beam state in a first beam state set being associated with the power control parameter.

In one embodiment, the association between the beam state and the power control parameter includes at least one of the following: an association between an index of a beam state in a basic beam state set and a power control parameter configured through higher layer signaling, an association between an index of a beam state in a first beam state set and a power control parameter configured through higher layer signaling, an association between an index of an activated beam state in a first beam state set and a power control parameter configured through Media Access Control (MAC) signaling, or an association between an index an activated beam state in a second beam state set and a power control parameter configured through MAC signaling.

In one embodiment, the power control parameter at least includes at least one of the following: a path-loss measurement parameter, a target received power, a path-loss compensation factor, or a closed loop power control parameter.

In some embodiments, if an uplink transmission is a PUSCH transmission, or a beam state is used for a PUSCH transmission, the power control parameter at least includes at least one of the following: a path-loss measurement parameter of a PUSCH, a target received power of the PUSCH, a path-loss compensation factor of the PUSCH, or a closed loop power control parameter of the PUSCH.

If the uplink transmission is a PUCCH transmission, or the beam state is used for a PUCCH transmission, the power control parameter at least includes one of the following: a path-loss measurement parameter of a PUCCH, a target received power of the PUCCH, or a closed loop power control parameter of the PUCCH.

If the uplink transmission is an SRS transmission, or the beam state is used for an SRS transmission, the power control parameter at least includes at least one of the following: a path-loss measurement parameter of an SRS, a target received power of the SRS, or a closed loop power control parameter of the SRS. In some embodiments, the closed power control parameter of the SRS includes one of the following: an independent SRS closed loop, a closed loop shared with a PUSCH, or an index of a closed loop shared with a PUSCH.

If the beam state is used for a PUSCH transmission and a PUCCH transmission, the power control parameter at least includes at least one of the following: a path-loss measurement parameter, a target received power of a PUSCH, a path-loss compensation factor of the PUSCH, a closed loop power control parameter of the PUSCH, a target received power of a PUCCH, or a closed loop power control parameter of the PUCCH.

If the beam state is used for a PUSCH transmission, a PUCCH transmission, and an SRS transmission, the power control parameter at least includes at least one of the following: a path loss measurement parameter, a target received power of a PUSCH, a path-loss compensation factor of the PUSCH, a closed loop power control parameter of the PUSCH, a target received power of a PUCCH, a closed loop power control parameter of the PUCCH, a target received power of an SRS, or a closed loop power control parameter of the SRS. In some embodiments, the power control parameter may be represented by an index of the power control parameter. The index of the power control parameter is an index of the power control parameter in a predetermined power control parameter set.

In one embodiment, configuring or indicating the beam state associated with the uplink transmission includes: configuring or indicating the beam state associated with the uplink transmission through indication information of the beam state. In some embodiments, the beam state associated with the uplink transmission includes at least one beam state.

In one embodiment, a correspondence between the indication information of the beam state and a beam state in the specific beam state set is determined in a predefined manner, or a correspondence between the indication information of the beam state and a beam state in the specific beam state set is determined through higher layer signaling or MAC signaling, or if the uplink transmission is a non-codebook based transmission, a correspondence between the indication information of the beam state and a beam state in the specific beam state set is determined through higher layer signaling or MAC signaling.

In some embodiments, the correspondence between the indication information between the beam state and a beam state in a predetermined beam state set may be determined in a predefined manner, where the predefined manner includes: predefining a table of correspondences between indication information of beam states and beam states in a specific beam state set, or sorting beam states and combinations of beam states in a specific beam state set in a predetermined order, and establishing correspondences with values of indication information of beam states.

In some embodiments, configuring the indication information of the beam state through MAC signaling includes establishing, activating, and updating a correspondence between the beam state and a beam state in the specific beam state set. For example, Table 1 illustrates a mapping relation table between a value of indication information of a configured beam state and a TCI state in a predefined manner employed in the present application, which is a mapping relation table between an indication information value of a beam state and a TCI state.

TABLE 1

Mapping relation table between an indication value of a beam state and a TCI state

| Value of indication information of a beam state | $1^{st}$ TCI state | $2^{nd}$ TCI state |
|---|---|---|
| 0 | TCI state index 0 | None |
| 1 | TCI state index 1 | None |
| 2 | TCI state index 0 | TCI state index 1 |
| 3 (reserved) | | |

In one embodiment, determining the power control parameter of the uplink transmission includes at least one of the following: determining a corresponding set of power control parameters based on a value of indication information of each beam state, or determining a set of power control parameters based on a beam state indicated by the indication formation of the beam state.

In some embodiments, the indication information of the beam state includes a scenario where a plurality of TCI states may be used for repeated transmissions of uplink transmissions or a scenario where a plurality of beams may be sent simultaneously, and a plurality of repeated transmissions or simultaneous occurrence of a plurality of uplink transmissions of a plurality of beams may correspond to a set of power parameters. Alternatively, for each TCI state, set of power control parameters may be determined.

In one embodiment, the corresponding set of power control parameters is determined based on the value of the indication information of each beam state in a case that at least one of the following conditions is met: the uplink transmission being a non-codebook based transmission, the beam state being associated with at least one SRS resource, or the number of ports of an SRS resource associated with the beam state being equal to 1.

In one embodiment, the set of power control parameters is determined based on the beam state indicated by the indication information of the beam state in a case that at least one of the following conditions is met: the uplink transmission being a codebook based transmission, the beam state being associated with one SRS resource, or the number of ports of an SRS resource associated with the beam state being greater than or equal to 1.

In one embodiment, when determining the power control parameter of an uplink transmission based on a TCI state is taken as an example, the process of determining the power control parameter will be illustrated below from the perspective of the first communication node. Exemplarily, the first communication node is a UE, a user, a terminal, or the like, and the second communication node is a base station, a NodeB, a NB, a gNB, an eNB, or a network.

In some embodiments, a power control parameter of the uplink transmission is determined based on a TCI state. In some embodiments, the power control parameter at least includes at least one of the following: a path-loss measurement parameter, a target received power parameter, a path-loss compensation factor (also referred to as path-loss compensation coefficient), or a closed loop power control parameter.

In some embodiments, the power control parameter may also be an index of the power control parameter in a preconfigured or predefined power control parameter set, i.e., the power control parameter may include at least one of the following: an index of path-loss measurement parameter, an index of target received power, an index of path-loss compensation factor, or an index of closed loop power control.

The power control parameter is used for a PUSCH transmission, a PUCCH transmission, and/or an SRS transmission. When applied to different types of transmissions, the index of the power control parameter is a power control parameter set configured based on the respective transmission type. For example, the index of the power control parameter of the PUSCH refers to respective power control parameter in the power control parameter set configured for the PUSCH.

If the uplink transmission is a PUSCH transmission, the power control parameter includes: a path-loss measurement parameter, a target received power parameter of a PUSCH, a path-loss compensation coefficient, and/or a closed loop power control parameter of the PUSCH.

If the uplink transmission is a PUCCH transmission, the power control parameter includes: a path-loss measurement parameter, a target received power parameter of a PUCCH, and/or a closed loop power control parameter of the PUCCH.

If the uplink transmission is an SRS transmission, the power control parameter includes: a path-loss measurement parameter, and/or a target received power parameter of an SRS.

A TCL state includes at least one piece of QCL information (i.e., QCL state) that includes reference signal information, and a QCL type parameter corresponding to the reference signal information. A TCI state refers to a TCI state of at least one of the following channels, signals or transmissions configured by the base station for the UE, including: a PDCCH, a PDSCH, a CSI-RS, a PUSCH, a PUCCH, and/or an SRS. Alternatively, a TCI state refers to a TCI state of a downlink channel, downlink signal or downlink transmission configured by the base station for the UE. Alternatively, a TCI state refers to a TCI state of an uplink channel, uplink signal or uplink transmission, and a downlink channel, downlink signal or downlink transmission configured by the base station for the UE. In some embodiments, the TCI state refers to a TCI state transmitted by an uplink channel or uplink signal, and a downlink channel or downlink signal, and configured by the base station for the UE. The TCI state refers to a TCI state common for an uplink channel and a downlink channel, an uplink signal and a downlink signal, or an uplink transmission and a downlink transmission. In other words, the TCI state is a cell-based TCI state configured by the base station for the UE. The cell includes a service cell, a primary cell, a secondary cell, and the like. Alternatively, the TCI state is a BWP-based TCI state configured by the base station for the UE.

In some embodiments, determining a power control parameter of the uplink transmission based on the TCI state includes that: the TCI state includes a power control parameter, or the TCI state has an association with a power control parameter.

In some embodiments, that the TCI state includes the power control parameter includes at least one of the following: a power control parameter included in the TCI state is a Path Loss-Reference (PL-RS) of the path-loss measurement parameter for use in at least one of the following channel, signal or transmission: a PUSCH, a PUCCH, or an SRS; a power control parameter included in the TCI state is a closed loop power control ID for use in at least one of the following channel, signal or transmission: a PUSCH, a PUCCH, or an SRS; a power control parameter included in the TCI state is a target received power P0 for use in a PUSCH, while a P0 of the PUCCH is obtained by the P0 of the PUSCH+offset that is configured through higher layer signaling, or a power control parameter included in the TCI state is a target received power P0 for use in a PUCCH, while P0 of the PUSCH is obtained by the P0 of the PUCCH+offset that is configured through higher layer signaling; the TCI state includes: P0 and alpha of a PUSCH, P0 of a PUCCH, and P0 of an SRS.

If a PUSCH transmission is indicated to refer to X TCI states, or a SRS resource in an SRS resource set is indicated to refer to X TCI states, Y transmission powers are determined based on one of the following manners (where X, Y are integers greater than or equal to 1, and X is greater than or equal to Y): that Y TCI states are determined in X TCI states, and P0 and alpha in the Y TCI states are used respectively to calculate Y transmission powers; X TCI states belong to Y packets, and P0 and alpha of the Y packets are determined to calculate Y transmission powers, respectively.

In some embodiments, determining P0 and alpha of a packet includes at least one of the following: using P0 included in or associated with the TCI state having the lowest index of the TCI state within the packet as P0 of the packet; using P0 included in or associated with the TCI state having the highest index of the TCI state within the packet as P0 of the packet; using alpha included in or associated with the TCI state having the lowest index of the TCI state within the packet as alpha of the packet; using alpha included or associated with the TCI state having the highest index of the TCI state within the packet as alpha of the packet; using a P0 average of TCI states within the packet as P0 of the packet; using the maximum value of P0 of the TCI state within the packet as P0 of the packet; using the minimum value of P0 of the TCI state within the packet as P0 of the packet; using an alpha average of the TCI states within the packet as alpha of the packet; using the maximum value of alpha of the TCI state within the packet as alpha of the packet; using the minimum value of alpha of the TCI state within the packet as alpha of the packet; using alpha of the TCI state having the maximum value of P0 within the packet as alpha of the packet; using alpha of the TCI state having the minimum value of P0 within the packet as alpha of the packet; using P0 of the TCI state having the maximum value of alpha within the packet as P0 of the packet; using P0 of the TCI state having the minimum value of alpha within the packet as P0 of the packet.

In some embodiments, TCI states having at least one of the following characteristics belong to the same packet: the TCI states being associated with the same packet; the TCI states include the same packet ID.

The packet includes a packet of the following characteristics: channel characteristics.

That the TCI state has an association with the power control parameter means that: the association between the TCI state and the power control parameter includes a TCI state index and a power control parameter index.

The power control parameter index includes at least one of the following: an open loop power control parameter index, a closed power control parameter index, and a path-loss measurement parameter index.

The power control parameter set is one of the following sets: a PUSCH power control set, a PUCCH power control set, an SRS power control set, a unified power control set.

In some embodiments, the TCI state index is from one of the following sets: a TCI state set of a PDSCH configured by an RRC or activated by an MAC CE, a TCI state set of a PDCCH configured by an RRC or activated by an MAC CE, a TCT state set of a PUCCH configured by an RRC or activated by an MAC CE, a TCI state set of a PUSCH configured by an RRC or activated by an MAC CE.

In some embodiments, the determining the power control parameter of the uplink transmission based on the TCI state further includes at least one of the following: determining a path-loss measurement parameter of the uplink transmission based on a downlink reference signal in the TCI state, determining a path-loss measurement parameter of the uplink transmission based on a periodic or semi-persistent downlink reference signal in the TCI state, determining a path-loss measurement parameter of the uplink transmission based on a downlink reference signal of the type D in the TCI state; the TCI state being a TCI state configured by a CORESET, determining a PL-RS of the uplink transmission based on a downlink RS of the TCI state of a CORESET, or determining a PL-RS of the uplink transmission based on a downlink RS of a TCI state of a CORESET having the lowest index.

In some embodiments, the downlink reference signal includes at least one of the following: an SSB, or a CSI-RS.

Figure 3:
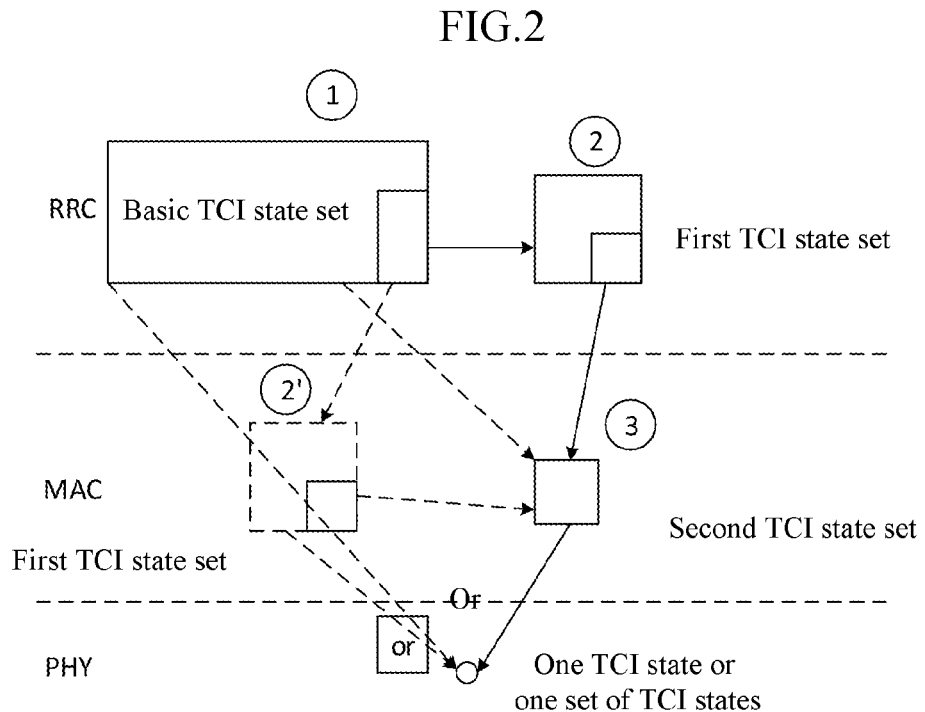
FIG. 3 illustrates a schematic diagram of an association between a power control parameter and a TCI state according to the present application.

In one embodiment, a TCI state may be divided into multiple levels of configurations to describe associations between the power control parameters and different levels of TCI states. In some embodiments, a process for configuring associations between power control parameters and different levels of TCI states will be explained with an example where a second communication node is used to configure power control parameters for a first communication node to associate them with different layers of TCI states. Exemplarily, the second communication node is a base station, and the first communication node is a UE. FIG. 3 illustrates a schematic diagram of an association between power control parameters and different levels of TCI states according to the present application.

In one embodiment, determining a power control parameter of an uplink transmission based on a TCI state corresponding to the uplink transmission includes: determining the TCI state corresponding to the uplink transmission; and determining a power control parameter corresponding to the uplink transmission in the TCI state.

In some embodiments, determining a TCI state corresponding to the uplink transmission includes at least one of the following: determining a TCI state corresponding to a PUSCH transmission based on a TCI state indicated in DCI scheduling or triggering the PUSCH transmission, determining a TCI state corresponding to a PUSCH transmission based on higher layer signaling for configuring the PUSCH transmission, determining a TCI state corresponding to a PUCCH transmission based on a TCI state associated with a PUCCH resource of the PUCCH transmission, or determining a TCI state corresponding to an SRS transmission based on an SRS spatial relation associated with an SRS resource of the SRS transmission.

In some embodiments, the TCI state in the above information is described through one of the following manners:

Description manner I: a TCI state index in the basic TCI state set, or a TCI state index in a subset of the basic TCI state set.

In some embodiments, the basic TCI state set is configured by the base station for the UE. The basic TCI state set includes at least one TCI state for determining a transmission parameter of channels or signals, including a PDCCH, a PDSCH, a CSI-RS, a PUSCH, a PUCCH, and/or an SRS. A TCI state in the basic TCI state set includes or is associated with a power control parameter. The power control parameter of an uplink transmission may be determined based on a TCT state corresponding to the uplink transmission. In some embodiments, the power control parameter includes: a path-loss measurement parameter, a target received power parameter, a path-loss compensation coefficient, and/or a closed loop power control parameter.

In some embodiments, different uplink transmissions may require different power control parameters, and the power control parameter includes: a path-loss measurement parameter, a target received power parameter of a PUSCH, a path-loss compensation coefficient, a closed loop power control parameter of a PUSCH, a target received power parameter of a PUCCH, a closed loop power control parameter of a PUCCH, and/or a target received power parameter of an SRS.

For example, for a PUSCH transmission, based on a TCI state indicated in DCI scheduling or triggering the PUSCH transmission, a power control parameter applied to the PUSCH transmission may be determined based on information of a respective TCI state in the basic TCI state set.

Description manner II: a TCI state index in a first TCI state set, or a TCI state index in a subset of the first TCI state set In some embodiments, the first TCI state set is configured or activated by the base station for the UE through higher layer signaling or MAC CE. The first TCI state set includes at least one TCI state or TCI state combination, and the first TCI state set is a subset of the basic TCI state set. The first TCI state set is used to determine a transmission parameter of channels or signals of an uplink transmission, such as a PUSCH, a PUCCH, an SRS, and/or the like. There may be multiple first TCI state sets respectively corresponding to different types of uplink transmissions. There may be one first TCI state set corresponding to multiple types of uplink transmissions. The basic TCI state set is similar to the one described in the above embodiments, and description thereof is omitted here for brevity.

A TCI state in the first TCI state set includes or is associated with a power control parameter. Based on the TCI state corresponding to the uplink transmission, a power control parameter of the uplink transmission may be determined.

Power control parameters included in or associated with a TCI state in the first TCI state set and those included or associated with the same TCI state in the basic TCI state set are of different types. That is, the parameters in the power control parameters may be associated with TCT state sets of different levels, respectively.

For example, the TCI state in the basic state set is associated with a path-loss measurement parameter. The TCI state in the first TCI state set is associated with other power control parameter, including at least one of the following: a target received power, a target received power of a PUSCH, a target received power of a PUCCH, a path-loss compensation coefficient, a closed loop power control coefficient, a closed loop power control parameter of a PUSCH, or a closed loop power control parameter of a PUCCH. When the first TCI state set is configured for a PUSCH, a PUCCH, and/or an SRS, the first TCI state set for the PUSCH, the PUCCH, and/or the SRS is associated with power control parameters related to the PUSCH, PUCCH, and/or the SRS, respectively.

For another example, the TCI state in the first TCI state set is associated with a path-loss measurement parameter, for determining a path-loss measurement parameter of a PUSCH transmission, a PUCCH transmission, and/or an SRS transmission. The TCI state in the basic TCI state set is associated with other power control parameter, including at least one of the following: a target received power, a target received power of a PUSCH, a target received power of a PUCCH, a path-loss compensation coefficient, a closed loop power control parameter, a closed loop power control parameter of a PUSCH, or a closed loop power control parameter of a PUCCH.

If power control parameters included in or associated with a TCI state in the first TCI state set and those included in or associated with the same TCI state in the basic TCI state set are of the same type, power control parameters in the first TCI state set are used, or relatively new power control parameters in the first TCI state set and the basic TCI state set are employed. That is, parameters in the power control parameters may be associated with TCI state sets of different levels.

Information of the MAC layer, such as power control parameters included in or associated with the first TCI state set, is used to update power control parameters included in or associated with the same TCI state in the basic TCI state set.

A prerequisite for using a relatively new power control parameter in the first TCI state set and the basic TCI state set lies in that the association between the first TCI state set and the power control parameter has been taken effect. For instance, the association will become effective in a period of time after the UE has received the MAC CE of the association between the first TCI state set and the power control parameter, for example, after 3 subframes following an Acknowledge (ACK) of the MAC CE sent by the UE.

When the first TCI state set includes more than one TCI state or one TCI state combination, there is a further need for scheduling information, for example, a TCI state corresponding to the uplink transmission indicated, based on the first TCI state, by indication information DCI of the physical layer.

Description III: a TCI state index in a second TCI state set or a subset of the second TCI state set, or a TCI state combined index in a second TCI state index or a subset of the second TCI state set.

In some embodiments, the second TCI state set is configured or activated by the base station for the UE through higher layer signaling or an MAC CE. The second TCI state set is a subset of a first TCI state set or basic TCI state set, including at least one TCI state or at least one TCI state combination. There may be multiple second TCI state sets respectively corresponding to different types of uplink transmissions. There may one second TCI state set corresponding to multiple types of uplink transmissions. See above for the description on the first TCI state set and the basic TCI state set.

When the second TCI state set includes more than one TCI state or one TCI state combination, there is a further need for scheduling information, such as a TCI state corresponding to the uplink information indicated by indication information DCI of the physical layer further based on the second TCI state.

The TCI state in the second TCI state set includes or is associated with a power control parameter. Based on the TCI state corresponding to the uplink transmission, a power control parameter of the uplink transmission may be determined.

Power control parameters included in or associated with a TCI state in the second TCI state set and those included in or associated with the same TCI state in the basic TCI state set or first TCI state set are of different types. That is, parameters in the power control parameters may be associated with TCI state sets of different levels, respectively.

For example, the TCI state in the basic TCI state set and/or the first TCI state set is associated with a path-loss measurement parameter for a PUSCH transmission, a PUCCH transmission, and/or an SRS transmission. The TCI state in the second TCI state set is associated with other power control parameters, including at least one of the following: a target received power, a target received power of a PUSCH, a target received power of a PUCCH, a path-loss compensation coefficient, a closed loop power control parameter, a closed loop power control parameter of the PUSCH, or a closed loop power control parameter of the PUCCH.

For another example, the TCI state in the second TCI state set is associated with a path-loss measurement parameter for a PUSCH, a PUCCH transmission, and/or an SRS transmission. The TCI state in the basic TCI state set and/or first TCI state set is associated with other power control parameters, including at least one of the following: a target received power, a target received power of a PUSCH, a target received power of a PUCCH, a path-loss compensation coefficient, a closed loop power control parameter, a closed loop power control parameter of the PUSCH, or the closed loop power control parameter of the PUCCH.

When the second TCI state set is configured for a PUSCH, a PUCCH, and/or an SRS, respectively, the second TCI state set for the PUSCH, the PUCCH, and/or the SRS are associated with power control parameters related to the PUSCH, the PUCCH, and/or the SRS, respectively.

In one embodiment, when the MAC layer is power control parameters associated with an activated TCI state, indication information of power control parameters are from a preconfigured set, also referred to as power control parameter set. The power control parameter set is configured by a higher layer. For example, a PL-RS parameter set includes 64 pieces of PL-RS information, and a P0 parameter set includes 32 P0 parameters. When the MAC CE are power parameters associated with one or more TCI states, it costs 6 bits to indicate a PL-RS, and 5 bits to indicate a P0.

In order to reduce the overheads for indicating power control parameters, the present embodiment provides determining a power control parameter subset (also referred to as activated power control parameter set) for an activated TCI state set, including the following manners: configuring M (where M=64, for example) power control parameters through higher layer signaling, which are also referred to as basic power control parameter set; selecting N power control parameters (where N is less than M, for example, 4) from M power control parameters through higher layer signaling or MAC signaling, where N power control parameters are referred to as activated power control parameter set; the activated power control parameter set is used to determine power control parameters of an activated TCI state.

In some embodiments, N power control parameters or N sets of power control parameters are selected from the M power control parameters in at least one of the following manners: a bitmap; or predefined or preconfigured parameters.

In some embodiments, the bitmap includes: a bitmap with a length of M, each bit corresponding to an activated/deactivated state of a power control parameter or a set of power control parameters. When N power control parameters or N sets of power control parameters are selected from M power control parameter, the bits in the bitmap have N activated states, for example, when the activated state is valued to 1; or the bitmap has a length of a*M, where each a bit corresponds to an activated/deactivated state of a power control parameter. a is an integer greater than or equal to 1.

In some embodiments, predefining or preconfiguring parameters includes: activating one or more packets in a manner of predefining or preconfiguring parameters.

In some embodiments, the activated power control parameter set may also be indicated by DCI information.

The activated power control parameter set may be configured in size. For example, when beams at the base station side have a relatively small interference difference therebetween, the activated power control parameter set may have a small size; otherwise, the activated power control parameter set may have a large size.

In some embodiments, the activated power control parameter set includes a path-loss measurement parameter set, an activated target received power parameter set, an activated path-loss compensation coefficient set, an activated open loop power control parameter set, and/or an activated closed loop power control parameter set. Each TCI state or TCI state combination is associated with a plurality of power control parameter indexes in the activated power control parameter set.

In some embodiments, the activated power control parameter set includes at least one activated power control parameter, where each activated power control parameter includes a path-loss measurement parameter, a target received power parameter, a path-loss compensation coefficient, an open loop power control parameter, and/or a closed loop power control parameter. Each TCI state or TCI state combination is associated with a power control parameter index in the activated power control parameter set.

In some embodiments, in order to further reduce P0/alpha overheads, a plurality of P0/alpha values may be indicated in a differential fashion between a plurality of TCI states and TCI state combinations indicated in the same signaling (e.g., MAC CE). For example, in an MAC CE, it is required to indicate a TCI state 0, a TCI state 1, and a combination of TCI states 0 and 1 respectively corresponding to 3 sets of power control parameter, where the P0 value of the TCI state 0 is an index indicating the P0 parameter in the activated power control parameter set, while the TCI state 1 and the combination of TCI states 0 and 1 are indicated an offset value relative to the P0 value of the TCI state 0. The offset indicating manner is determined by a predefined manner and/or a parameter configuring manner.

In one embodiment, DCI scheduling or triggering a PUSCH transmission indicates a TCI state related to the PUSCH transmission, or a TCI state related to the PUSCH is acquired based on MAC CE information, and the power control parameter of the PUSCH transmission is determined based on the TCI state related to the PUSCH transmission. The TCI state related to the PUSCH transmission includes one or more TCI states.

Determining power control parameters of the PUSCH transmission based on the TCI state related to the PUSCH transmission includes at least one of the following:

Approach 1: power control parameters of the PUSCH transmission are determined based on power control parameters of a PUSCH included in the TCI state related to the PUSCH transmission.

In some embodiments, information of the TCI state includes power control parameters, and the power control parameters at least include power control parameters of the PUSCH transmission, and a part of the power control parameters, such as a path-loss measurement parameter, can also be used to determine a power of a PUCCH transmission, or an SRS transmission.

Approach 2: power control parameters of the PUSCH transmission are determined based on an association between a TCI state related to the PUSCH transmission and the power control parameters of the PUSCH. For example, power control parameters of the PUSCH transmission are determined based on an association between the TCI state of the PUSCH and the power control parameters of the PUSCH.

In some embodiments, a table of an association between TCI states and power control parameters of the PUSCH includes an association between at least one TCI state and power control parameters of the PUSCH. The association between each TCI state and the power control parameter of the PUSCH includes at least one of the following: an index of the association between the TCI state and the power control parameter of the PUSCH, an index of the TCI state, the power control parameter of the PUSCH, or an index of the power control parameter of the PUSCH.

In some embodiments, the TCI state index refers to an index of a TCI state or a combined index of a TCI state in a specific TCI state set. The specific TCI state set includes one of the following: a TCI state set configured or activated for one of or a combination of a PDSCH, a PDCCH (or Control Resource Set (CORESET)), a PUSCH, a PUCCH or an SRS, a basic TCI state set, a first TCI state set, or a second TCI state set.

In some embodiments, the index of the association between the TCI state and the power control parameter of the PUSCH has an association with at least one TCI state index. The at least one TCI state index is determined by an index of the TCI state and/or a combined index of the TCI state in the specific TCI state set. For example, if the specific TCI state set includes 2 TCI states, the indexes of the TCI states are 0 and 1, and the combined index of TCI states is 0 and 1. The indexes 0, 1 and 2 of the association between the TCI state and the power control parameter of the PUSCH correspond to the indexes of the TCI states 0, 1, 0 and 1, respectively.

In some embodiments, the index of the association between the TCI state and the power control parameter of the PUSCH has an association with more than one TCI state index, and the more than one TCI state index is determined by a combination of indexes of the TCI states in the specific TCI state set. At this time, the association between the TCI state and the power control parameters of the PUSCH includes X sets of power control parameters of the PUSCH, where X is 0, 1, or an integer greater than 1. If X=0 (i.e., the association between the TCI state and the power control parameter of the PUSCH does not include power control parameter of the PUSCH), the power control parameter corresponding to the index of the association between the TCT state and the power control parameter of the PUSCH is the power control parameter of the PUSCH that respectively correspond to a plurality of TCI state indexes corresponding to the index of the association between the TCI state and power control parameters of the PUSCH; If X=1, a respective set of power control parameters are used for a PUSCH transmission related to more than one TCI state index that corresponds to the association between the TCI state and the power control parameters of the PUSCH; if X is greater than 1, X sets of power control parameters are respectively used for a PUSCH transmission related to X packets of a plurality of TCI state indexes that correspond to the index of the association between the TCI state and the power control parameter of the PUSCH. For example, if an association between a TCI state and the power control parameter of a PUSCH corresponds to 2 indexes of the TCI state, namely 0 and 1, and the association between the TCI state and the power control parameter of a PUSCH includes X=2 sets of power control parameters of the PUSCH, the 2 sets of power control parameters of the PUSCH respectively correspond to PUSCH transmissions having the indexes of the TCI state of 0 and 1. For another example, if an association between a TCI state and the power control parameters of a PUSCH corresponds to 4 indexes of the TCI state, namely 0, 1, 2 and 3, and the association between the TCI state and the power control parameters of the PUSCH includes X=2 sets of power control parameters of the PUSCH, the 2 sets of power control parameters of the PUSCH respectively correspond to a PUSCH transmission of two packets having the indexes of the TCI state of 0 through 3, where 4 TCI states are divided into X=2 groups, which are determined in a predefined manner, or based on configuration information (e.g., the indexes of the TCI state of 0 and 1 are a first packet, and the indexes of the TCI state of 2 and 3 belong to a second packet).

Approach 3: a power control parameter of a PUSCH transmission is determined based on a Sounding Reference Signal Resource Indication (SRI) associated with a TCI state related to the PUSCH transmission. For example, based on an SRI related to the TCI state, a mapping relation table between the SRI and the power control parameter of the PUSCH is searched, so as to determine the power control parameter of the PUSCH transmission.

In some embodiments, the TCI state includes SRI information. The SRI information indicates one or more SRS resources in an SRS resource set.

In some embodiments, the TCI state has an association with the SRI information. For example, one or more SRS resource indexes included in the TCI state are consistent with one or more SRS resource indexes indicated by the SRI.

Figure 4:
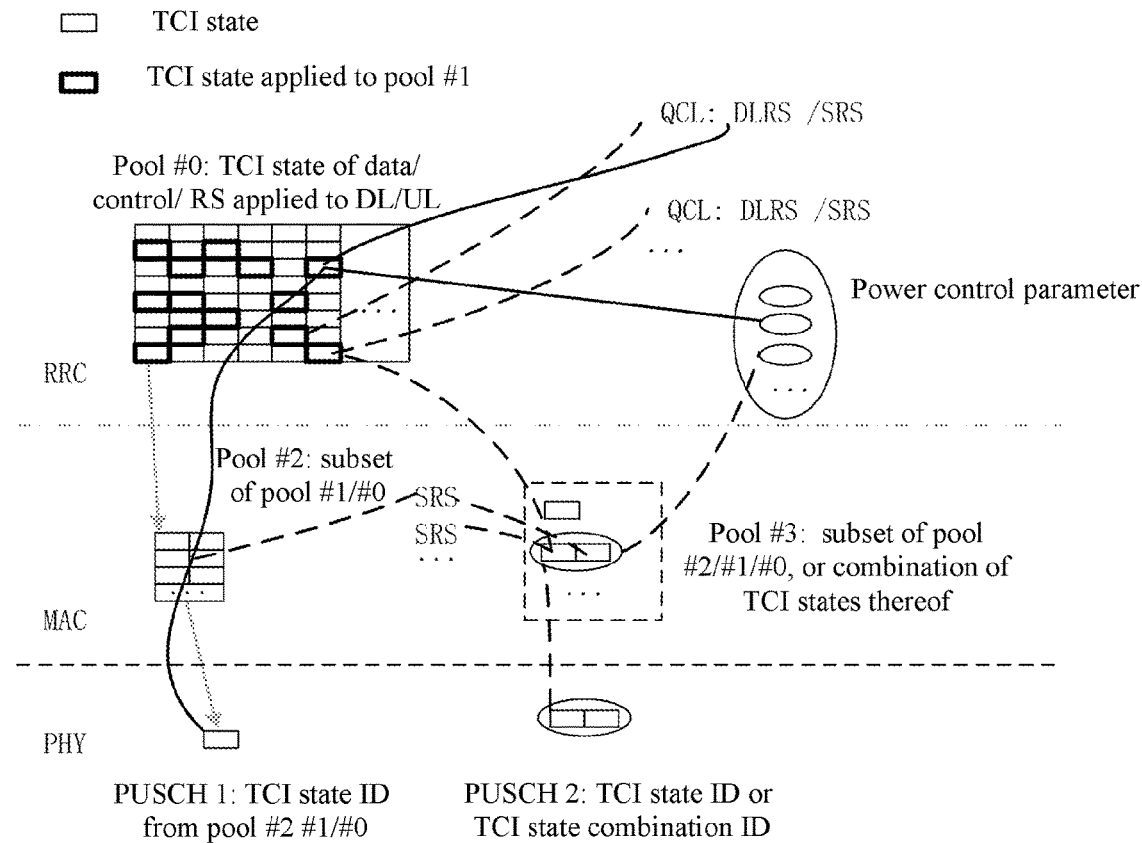
FIG. 4 illustrates a schematic diagram of a configuration of a TCI state at different levels according to embodiments of the present application.

FIG. 4 illustrates a schematic diagram of a configuration of a TCI state at different levels according to embodiments of the present application. The TCI state of the PUSCH 1 is indicated by a TCI state from a pool #2, #1 or #0. The TCI state is configured to be associated with power control parameters in the pool #1 or #0. Therefore, the power control parameter of the PUSCH 1 transmission may be determined based on power control parameter associated with the TCI state corresponding thereto.

The TCI state of a PUSCH 2 is indicated by a TCI state from a pool #3. The TCI states in the pool #3 include at least one TCI state combination ID each indicating one or more TCI states. Each TCI state combination ID is associated with power control parameter. The association between the TCI state combination ID and the power control parameter is indicated by an MAC CE or higher layer signaling.

In one embodiment, determining a TCI state related to a PUCCH transmission includes determining a power control parameter of the PUCCH based on the TCI state.

Determining a TCI state related to a PUCCH transmission based on one of the following: a TCI state included in a PUCCH spatial relation associated with a PUCCH resource corresponding to the PUCCH transmission, a TCI state associated with a PUCCH resource corresponding to the PUCCH transmission.

In some embodiments, through higher layer signaling, such as RRC signaling, the base station configures for the UE a basic TCI state set used to determine a transmission parameter of channels or signals including a PDCCH, a PDSCH, a CSI-RS, a PUSCH, a PUCCH, an SRS, and/or the like.

In some embodiments, the TCI state related to the PUCCH transmission is from a basic TCI state set, or a first TCI state set, a subset of the basic TCI state set. The first TCI state set is configured or activated by higher layer signaling or an MAC CE based on the basic TCI state set.

Alternatively, the TCI state is from a second TCI state set that is activated by the MAC CE. The second TCI state set is determined based on the basic TCI state set and/or the first TCI state set, or is a subset of the basic TCI state set or the first TCI state set.

In some embodiments, each TCI state member in the first TCI state set or second TCI state set is associated with a set of power control parameters. The association between the TCI state and the power control parameter may be configured by the higher layer signaling, and/or configured or updated by MAC signaling.

Figure 5:
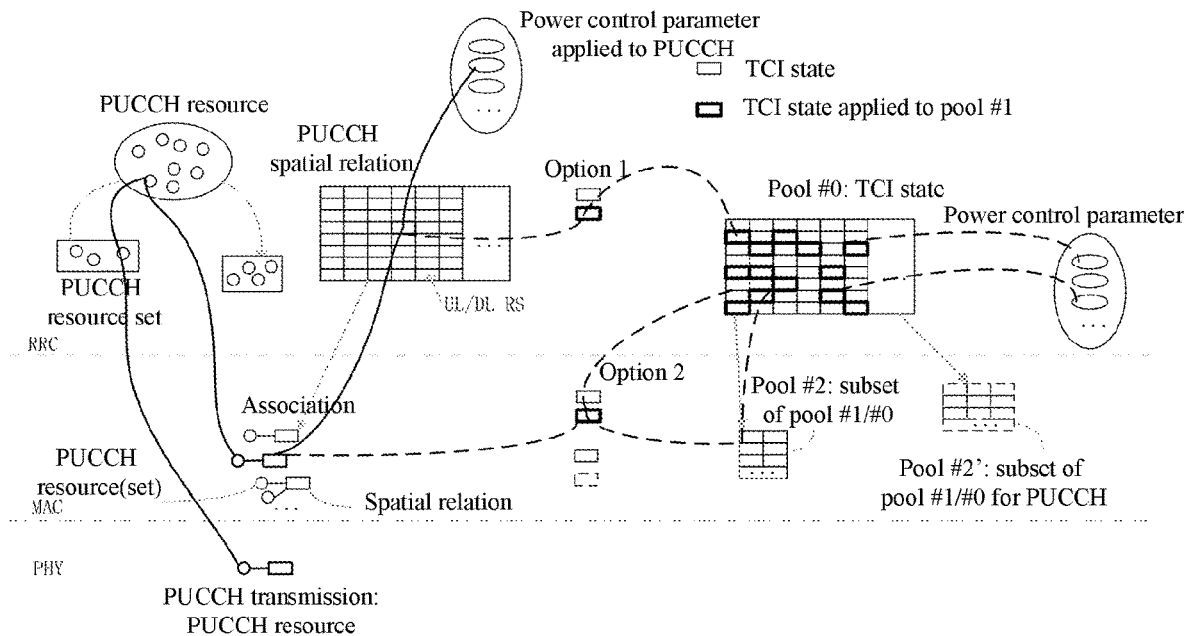
FIG. 5 illustrates a schematic diagram of a configuration of another TCI state at different levels according to embodiments of the present application.

FIG. 5 illustrates a schematic diagram of a configuration of another TCI state at different layers according to embodiments of the present application, where a PUCCH resource corresponding thereto has an association with a spatial relation.

Option 1: the spatial associated with a PUCCH resource may be from a PUCCH spatial relation pool configured by higher layer signaling, where the PUCCH spatial relation in the pool refers to a TCI state referenced by the PUCCH transmission, which is a TCI state from the pool #0 or #1 respectively corresponding to the basic beam state set or the first beams state set. Based on the power control parameter associated with the above referenced TCI state, the power control parameter of the PUCCH transmission is determined.

Option 2: the spatial associated with a PUCCH resource is a TCI state from the pool #2, #1 or #0 that correspond to a second beam state set, a first beam state set, or a basic beam state set, respectively. The pool #2' in the figure refers to the second beam state set configured only for the PUCCH. Pool #2 is a beam state set shared by the PUCCH with another transmission. Based on the power control parameter associated with the TCI state corresponding to the spatial relation associated with the PUCCH resource, the power control parameter of the PUCCH transmission is determined.

In one embodiment, the power control parameter of an SRS may be determined in the following modes:

Approach 1: the base station configures for the UE at least one SRS resource, and configures at least one SRS resource set, where each SRS resource set includes at least one SRS resource index, and a power control parameter of the SRS. The SRS resource set includes a spatial relation parameter that includes one of the following: an SSB, a CSI-RS, an SRS, or a TCI state.

When the UE sends an SRS transmission, the power control parameter are determined based on an SRS resource set to which the SRS resource of the SRS transmission belongs. An SRS resource set corresponds to a set of power control parameter, where the same power control parameter is used for all SRS resources.

Approach 2: the base state configures a basic TCI state set for the UE. The basic TCI state set includes at least one TCI state for determining a transmission parameter of channels or signals including a PDCCH, a PDSCH, a CSI-RS, a PUSCH, a PUCCH, an SRS, or the like.

A TCI state in the basic state sets includes a power control parameter.

Based on the power control parameter associated with the TCI state associated with the SRS resource, the power control parameter of the SRS transmission corresponding to the SRS resource is determined.

In some embodiments, for an SRS for a specific use, such as beam management, power control parameters of all SRS resources in the SRS resource set should be consistent, and it therefore is required to determine a set of power control parameters based on power control parameters corresponding to all SRS resources in the SRS resource set.

In some embodiments, the SRS resource set includes a plurality of SRS resource groups. For example, in a scenario with multiple Transmission Points (TRPs) and multiple panels, it is required to determine, based on power control parameters respectively corresponding to the SRS resources in the SRS resource group, a set of power control parameters corresponding to the SRS resource group.

In some embodiments, the method for determining a set of power control parameters based on at least one set of power control parameters associated with a TCI state corresponding to at least one SRS resource in an SRS resource set or SRS resource group includes at least one of the following: power control parameters associated with a TCI state corresponding to an SRS resource having a specific SRS resource index (e.g., a lowest index or a highest index) in the SRS resource set or SRS resource group, an average value of the power control parameters associated with the TCI state corresponding to all the SRS resources in the SRS resource set or SRS resource group.

Figure 6:
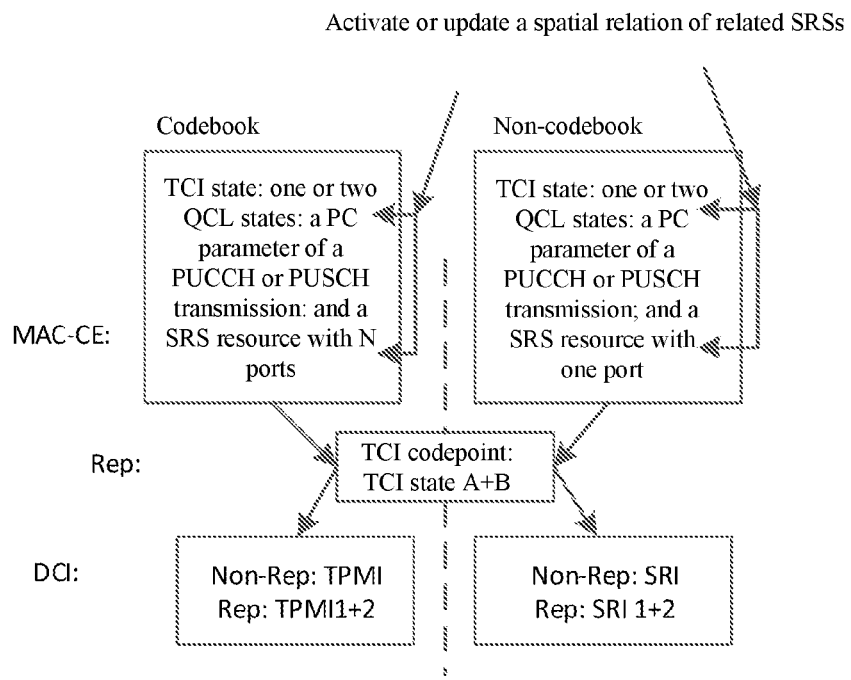
FIG. 6 illustrates a schematic diagram of a relation between a TCI state and Power Control (PC) and a Sounding Reference Signal (SRS) resource according to embodiments of the present application.

The power parameters include a P0 parameter, an alpha parameter, and/or a PL-RS parameter. In one embodiment, a relation between a TCI state and a PC parameter and an SRS resource is described. FIG. 6 illustrates a schematic diagram of a relation between a TCI state and a PC parameter and an SRS resource according to embodiments of the present application.

The TCI state only includes or is associated with a downlink RS, and when it is applied to an uplink transmission, the downlink RS cannot provide port information. As such, there is provided the following solution according to embodiments of the present application.

The base station configures for the UE at least one TCI state that is associated with at least one SRS resource.

When applied to a codebook-based PUSCH transmission, the TCI state is associated with an SRS resource.

When applied to a non-codebook-based PUSCH transmission, the TCI state is associated with the at least one SRS resource.

That the TCI state is associated with the SRS resource includes: the TCI state includes an SRS resource index, or a TCI state index has an association with the SRS resource index.

When more than one TCI state is used in a PUSCH transmission, for example, when different TCI states are used repeatedly in a PUSCH transmission, DCI scheduling or triggering the PUSCH transmission includes TCI state indication information, where a value of each piece of TCI state indication information indicates one or more TCI states.

For batch processing, when more than one TCI state is used in a PUSCH transmission, a TCI state compatible with the PUSCH transmission may be used. As such, DCI scheduling or triggering the PUSCH transmission includes TCI state indication information, where a value of each piece of TCI state indication information indicates one or more TCI states.

In some embodiments, for a codebook based PUSCH transmission, DCI scheduling or triggering a PUSCH includes Transmitted Precoding Matrix Indication (TPMI) information. In order to support use of more than one TCI state in a PUSCH transmission, DCI scheduling or triggering the PUSCH transmission includes at least one piece of TPMI information. The at least one TPMI information may be coded jointly.

In some embodiments, for a non-codebook based PUSCH transmission, DCI scheduling or triggering the PUSCH transmission includes SRI information. In order to support use of more than one TCI state in a PUSCH transmission, DCI scheduling or triggering the PUSCH transmission includes at least one piece of SRI information. The at least one SRI information may be coded jointly.

The UE determines transmitting a parameter of the PUSCH transmission through at least one of the following included in the DCI scheduling or triggering the PUSCH transmission, including: indication information of at least one TCI state, indication information of at least one TPMI, or indication information of at least one SRI.

The TCI state has an association with the power control parameters. The UE obtains a TCI state corresponding to the PUSCH transmission through the DCI scheduling or triggering the PUSCH transmission, and acquires the power control parameter of the PUSCH transmission using the association between the TCI state and the power control parameter.

Figure 7:
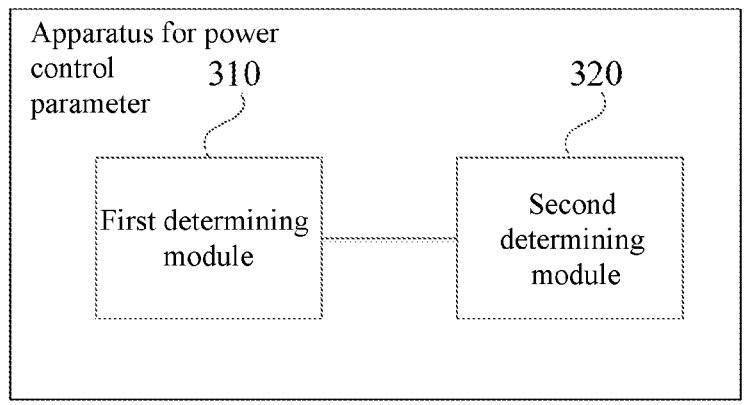
FIG. 7 illustrates a block diagram of a structure of an apparatus for determining a power control parameter according to embodiments of the present application.

In one embodiment, FIG. 7 illustrates a block diagram of a structure of an apparatus for determining a power control parameter. The present embodiment is applied at a first communication node. As shown therein, the present embodiment includes a first determining module 310 and a second determining module 320.

The first determining module 310 is configured to determine a beam state of an uplink transmission.

The second determining module 320 is configured to determine a power control parameter of the uplink transmission based on the beam state.

The beam state at least includes one of the following: a Quasi Co-Location (QCL) state, a Transmission Configuration Indication (TCI) state, spatial relation information, reference signal information, spatial filter information, or precoding information.

The power control parameter determining apparatus according to the embodiment is configured to implement the method for determining a power control parameter applied to the first communication node according to the embodiment as shown in FIG. 1. The apparatus for determining a power control parameter according to the present embodiment is identical to the method for determining a power control parameter applied to the first communication node according to the embodiment as shown in FIG. 1 in terms of implementation principle, which is not described here for brevity.

In one embodiment, the uplink transmission at least includes one of the following: a PUSCH transmission, a PUCCH transmission, an SRS transmission, or a PRACH transmission.

In one embodiment, the beam state includes at least one beam state.

In one embodiment, the beam state is indicated by information of one of the following: an index of at least one beam state in a specific beam state set, an index of at least one beam state in activated beam states in a specific beam state set, a combined index of at least one beam state in a specific beam state set, or a combined index of at least one beam state in activated beam states in a specific beam state set, and the specific beam state set is configured or activated through higher layer signal or MAC layer signaling.

In one embodiment, the beam state of the uplink transmission at least includes one of the following: a beam state referenced by the uplink transmission; a beam state associated with the uplink transmission; a beam state indicated by downlink control information DCI scheduling or triggering the uplink transmission; a beam state configured by higher layer signaling for the uplink transmission; or a beam state associated with a resource of the uplink transmission.

In one embodiment, the second determining module is configured to perform one of the following acts: determining the power control parameter of the uplink transmission based on the power control parameter or an index of the power control parameter included in the beam state, or determining the power control parameter of the uplink transmission based on an association between the beam state and the power control parameter.

In one embodiment, the association between the beam state and the power control parameter includes an association element between at least one beam state and the power control parameter, and an association element between the beam state and a power control parameter includes: at least one of and index of the association element between the beam state and the power control parameter, the beam state, or the power control parameter.

In one embodiment, the power control parameter at least includes at least one of the following: a path-loss measurement parameter, a target received power, a path-loss compensation factor, or a closed loop power control parameter.

In one embodiment, if the uplink transmission is a PUSCH transmission, or the beam state is used for a PUSCH transmission, the power control parameter at least includes at least one of the following: a path-loss measurement parameter of a PUSCH, a target received power of the PUSCH, a path-loss compensation factor of the PUSCH, or a closed loop power control parameter of the PUSCH, or if the uplink transmission is a PUCCH transmission, or the beam state is used for a PUCCH transmission, the power control parameter at least includes at least one of the following: a path-loss measurement parameter of a PUCCH, a target received power of the PUCCH, or a closed loop power control parameter of the PUCCH; when the uplink transmission is an SRS transmission, or the beam state is used for an SRS transmission, the power control parameter at least includes at least one of the following: a path-loss measurement parameter of an SRS, a target received power of the SRS, or a closed loop power control parameter of the SRS; when the beam state is used for a PUSCH transmission and a PUCCH transmission, the power control parameter at least includes at least one of the following: a path-loss measurement parameter, a target received power of a PUSCH, a path loss compensation factor of the PUSCH, a closed loop power control parameter of the PUSCH, a target received power of a PUCCH, or a closed loop power control parameter of the PUCCH; alternatively, when the beam state is used for a PUSCH transmission, a PUCCH transmission, and an SRS transmission, the power control parameter at least includes at least one of the following: a path-loss measurement parameter, a target received power of a PUSCH, a path-loss compensation factor of the PUSCH, a closed loop power control parameter of the PUSCH, a target received power of a PUCCH, a closed loop power control parameter of the PUCCH, a target received power of an SRS, or a closed loop power control parameter of the SRS.

In one embodiment, characteristics of the beam state include at least one of the following: a beam state configured or associated with an SRS resource; a beam state for an uplink transmission; or a beam state non-dedicated for a downlink transmission.

In one embodiment, if the beam state is used for a PUSCH transmission, the beam state is configured or associated with an SRS resource.

In one embodiment, the path-loss measurement parameter included in or associated with the beam state is used to determine a path-loss measurement parameter of at least one of the following uplink transmissions: a PUSCH transmission, a PUCCH transmission, an SRS transmission, or a PRACH transmission.

In one embodiment, the path-loss measurement parameter associated with the beam state is determined based on a Reference Signal (RS) in the beam state; or if the beam state is not configured or provided with the path-loss measurement parameter, the path-loss measurement parameter associated with the beam state is determined based on a Reference Signal (RS) in the beam state.

In one embodiment, the RS in the beam state includes at least one of the following features: a downlink RS, a periodic RS, a semi-persistent RS, an RS of a first QCL type, or an RS of a second QCL type, and the first QCL type includes one of the following: a type A, a type B, a type C, or a QCL type corresponding to a QCL parameter other than a spatial parameter; the second QCL type includes one of the following: a type D, or a QCL type corresponding to the spatial parameter.

In one embodiment, determining the path-loss measurement parameter associated with the beam state based on a Reference Signal (RS) in the beam state includes at least one of the following: if the beam state includes the RS of the second QCL type, determining the path-loss measurement parameter associated with the beam state based on the RS of the second QCL type included in the beam state, and if the beam state does not include an RS of the second QCL type, determining the path-loss measurement parameter associated with the beam state based on the RS of the first QCL type included in the beam state, and if the uplink transmission is in a Frequency Range (FR) 1, determining the path-loss measurement parameter associated with the beam state based on the RS of the first QCL type included in the beam state.

In one embodiment, if the beam state is not configured or provided with the path-loss measurement parameter, the path-loss measurement parameter associated with the beam state is determined by at least one of the following: an RS included in QCL information of the beam state; a downlink RS included in the QCL information of the beam state; a periodic RS included in the QCL information of the beam state; or a semi-persistent RS included in the QCL information of the beam state.

In one embodiment, if the beam state is not configured or provided with the path-loss measurement parameter, the path-loss measurement parameter associated with the beam state is determined by at least one of the following: a path-loss measurement parameter of a cell where the uplink transmission is located or a cell having a lowest index in cells configured for the first communication node; a BandWidth Part (BWP) where the uplink transmission is located, an activated BWP in a cell where the uplink transmission is located, or a path-loss measurement parameter of a BWP having a lowest BWP index in the cell where the uplink transmission is located; or a path-loss measurement parameter determined based on the control resource set.

Figure 8:
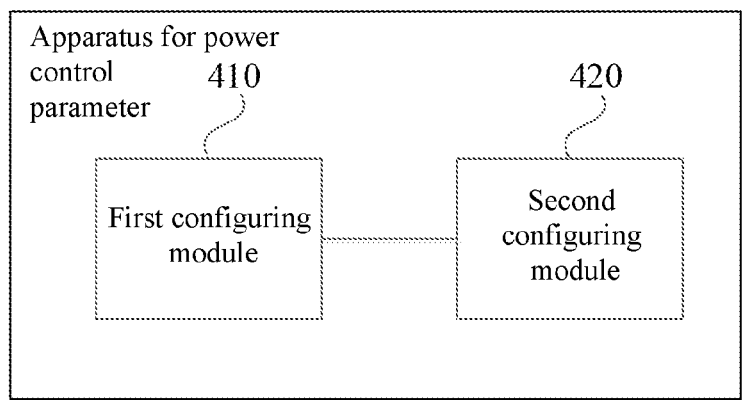
FIG. 8 illustrates a block diagram of a structure of another apparatus for determining a power control parameter according to embodiments of the present application.

In one embodiment, FIG. 8 illustrates a block diagram of a structure of another apparatus for determining a power control parameter according to an embodiment of the present application. The present embodiment is applied at a second communication node. As shown therein, the present embodiment includes: a first configuring module 410 and a second configuring module 420.

The first configuring module 410 is provided to configure or activate a specific beam state set.

The second configuring module 420 is provided to configure or indicate a beam state associated with the uplink transmission, where the beam state associated with the uplink transmission is used to determine a power control parameter of the uplink transmission.

The beam state associated with the uplink transmission includes: at least one beam state in the specific beam state set.

The beam state at least includes one of the following: a Quasi Co-Location (QCL) state, a Transmission Configuration Indication (TCI) state, spatial relation information, reference signal information, spatial filter information, or precoding information.

The apparatus for determining a power control parameter according to the embodiment is provided to implement the method for determining a power control parameter applied to the first communication node according to the embodiment as shown in FIG. 1. The apparatus for determining a power control parameter according to the present embodiment is identical to the method for determining a power control parameter applied to the first communication node according to the embodiment as shown in FIG. 1 in terms of implementation principle, which is not described here for brevity.

In one embodiment, the uplink transmission at least includes one of the following: a PUSCH transmission, a PUCCH transmission, an SRS transmission, or a PRACH transmission.

In one embodiment, the path-loss measurement parameter included in or associated with the beam state is used to determine a path-loss measurement parameter of at least one of the following uplink transmissions: a PUSCH transmission, a PUCCH transmission, an SRS transmission, or a PRACH transmission.

In one embodiment, the specific beam state set includes: a basic beam state set, and, the beam state set includes at least one of the following features: the basic beam state set including at least one beam state, the basic beam state set being configured or reconfigured through higher layer signaling, or the basic beam state set being used to determine a transmission parameter of at least one of the following channels or signals: a PDCCH, a PDSCH, a Channel State Information Reference Signal (CSI-RS), a PUSCH, a PUCCH, or an SRS.

In one embodiment, the specific beam state set includes: a first beam state set, and the first beam state set includes at least one of the following features: the first beam state set including at least one beam state in the basic beam state set, beam states in the first beam state set being configured or reconfigured through higher layer signaling, or being activated through MAC signaling, or the first beam state set being used to determine a transmission parameter of at least one of the following channels or signals: a PUSCH, a PUCCH, or an SRS, and the basic beam state set includes at least one of the following features: a basic beam state set including at least one beam state, the basic beam state set being configured or reconfigured through higher layer signaling, or the basic beam state set being used to determine a transmission parameter of at least one of the following: a PDCCH, a PDSCH, a Channel State Information Reference Signal (CSI-RS), a PUSCH, a PUCCH, or an SRS.

In one embodiment, the specific beam state set includes: a second beam state set, and the second beam state set includes at least one of the following features: the second beam state set including at least one beam state in the first beam state set, beam states in the second beam state set being activated through MAC signaling, or the second beam state set being used to determine a transmission parameter of at least one of the following channels or signals: a PUSCH, a PUCCH, or an SRS, and a first beam state set includes at least one of the following features: the first beam state set including at least one beam state in a basic beam state set, beam states in the first beam state set being configured or reconfigured through higher layer signaling, or being activated through MAC signaling, or the first beam state set being used to determine a transmission parameter of at least one of the following channels or signals: a PUSCH, a PUCCH, or an SRS, or the basic beam state set includes at least one of the following features: the basic beam state set including at least one beam state, the basic beam state set being configured or reconfigured through higher layer signaling, or the basic beam state set being used to determine a transmission parameter of at least one of the following channels or signals: a PDCCH, a PDSCH, a Channel State Information Reference Signal (CSI-RS), a PUSCH, a PUCCH, or an SRS.

In one embodiment, determining a power control parameter of the uplink transmission using the beam state associated with the uplink transmission incudes one of the following: determining the power control parameter of the uplink transmission based on the power control parameter or an index of the power control parameter included in the beam state, or determining the power control parameter of the uplink transmission based on an association between the beam state and the power control parameter.

In one embodiment, the association between the beam state and the power control parameter includes an association element between at least one beam state and the power control parameter; the beam state and power control parameter associating unit includes at least one of: an index of the association element between the beam state and the power control parameter, the beam state, or the power control parameter.

In one embodiment, the beam state is indicated by information of one of the following: an index of the beam state, a combined index of the beam state.

In one embodiment, the association between a beam state and the power control parameter includes one of the following: configuring, through higher layer signaling or Media Access Control (MAC) signaling, an association between at least one beam state in the specific beam state set and the power control parameter.

In one embodiment, the association between the beam state and the power control parameter includes at least one of the following: an association between an index of a beam state in a basic beam state set and a power control parameter configured through higher layer signaling, an association between an index of a beam state in a first beam state set and a power control parameter configured through higher layer signaling, an association between an index of an activated beam state in a first beam state set and a power control parameter configured through Media Access Control (MAC) signaling, or an association between an index of an activated beam state in a second beam state configured through MAC signaling and the power control parameter.

In one embodiment, the power control parameter at least includes at least one of the following: a path-loss measurement parameter, a target received power, a path-loss compensation factor, or a closed loop power control parameter.

In one embodiment, the configuring module is provided to configure or indicate a beam state associated with an uplink transmission by indication information of the beam state.

In one embodiment, a correspondence between the indication information of the beam state and a beam state in the specific beam state set is determined in a predefined manner, or a correspondence between the indication information of the beam state and a beam state in the specific beam state set is determined through higher layer signaling or MAC signaling, or if the uplink transmission is a non-codebook based transmission, a correspondence between the indication information of the beam state and a beam state in the specific beam state set is determined through higher layer signaling or MAC signaling.

In one embodiment, determining the power control parameter of the uplink transmission includes at least one of the following: determining a corresponding set of power control parameters based on a value of indication information of each beam state, or determining a set of power control parameters based on a beam state indicated by the indication formation of the beam state.

In one embodiment, the corresponding set of power control parameters is determined based on the value of the indication information of each beam state in a case that at least one of the following conditions is met: the uplink transmission being a non-codebook based transmission, the beam state being associated with at least one SRS resource, or the number of ports of an SRS resource associated with the beam state being equal to 1.

In one embodiment, the set of power control parameters is determined based on the beam state indicated by the indication information of the beam state in a case that at least one of the following conditions is met: the uplink transmission being a codebook based transmission, the beam state being associated with one SRS resource, or the number of ports of an SRS resource associated with the beam state being greater than or equal to 1.

Figure 9:
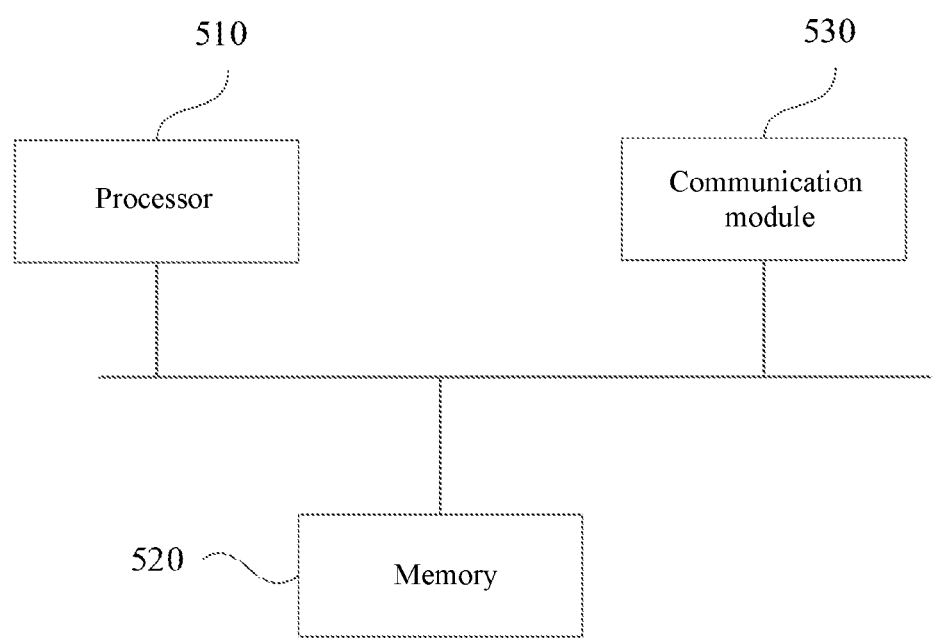
FIG. 9 illustrates a schematic diagram of a structure of a device according to embodiments of the present application.

FIG. 9 illustrates a schematic diagram of a structure of a device according to embodiments of the present application. As shown therein, the device according to the present application includes: a processor 510, a memory 520 and a communication module 530. The device may include one or more processors 510, where one processor 510 is used in FIG. 9 as an example. The device may include one or more memories 520, where a memory 529 is used in FIG. 9 as an example. In the device, the processor 510, the memory 520 and the communication module 530 may be connected via a bus or in other manner, where a bus connection is employed in FIG. 9. In some embodiments, the device is a first communication node.

The memory 520, as a computer readable storage medium, may be configured to store software programs, computer executable programs and modules, such as program instructions/modules corresponding to the device according to any one of the embodiments of the present application (e.g., the first determining module and the second determining module in the apparatus for determining a power control parameter). The memory 520 may include a program storage zone and a data storage zone, where the program storage zone can store an operating system, and application programs required by at least one function; the data storage zone can also store data created as required by an apparatus, and the like. In addition, the memory 520 can include a high speed random access memory, and can also include a non-volatile memory, such as at least one disk storage device, a flash device, or other non-volatile solid state storage device. In some embodiments, the memory 520 may include memories disposed remotely relative to the processor 510, and those remote memories may be connected to the device via a network connection. Examples of the network include, but are not limited to, an internet, an intranet, a local area network, a mobile communication network, and a combination thereof.

The communication module 530 is provided to implement a communication connection between the first communication node and the second communication node, to fulfil data communication and signal communication.

The above-mentioned device may be provided to perform the method for determining a power control parameter applied to the first communication node according to any one of the above embodiments, which possesses respective functions.

When the device is a second communication node, the above-mentioned device may be provided to perform the method for determining a power control parameter applied to the second communication node according to any one of the above embodiments, which possesses respective functions.

According to embodiments of the present application, there is also provided a storage medium including computer executable instructions configured to perform a method for determining a power control parameter applied at a first communication node when executed by a computer processor, the method including: determining a beam state of an uplink transmission; determining, based on the beam state, the power control parameter of the uplink transmission, and the beam state includes at least one of the following: a Quasi Co-Location (QCL) state, a Transmission Configuration Indication (TCI) state, spatial relation information, reference signal information, spatial filter information, or precoding information.

According to embodiments of the present application, there is further provided a storage medium including computer executable instructions configured to perform a method for determining a power control parameter applied at a second communication node when executed by a computer process, the method including: configuring or activating a specific beam state set; and configuring or indicating a beam state associated with an uplink transmission, the beam state associated with the uplink transmission being used to determine a power control parameter of the uplink transmission, and the beam state associated with the uplink transmission includes: at least one beam state in the specific beam state set, and the beam state at least includes one of the following: a Quasi Co-Location (QCL) state, a Transmission Configuration Indication (TCI) state, spatial relation information, reference signal information, spatial filter information, or precoding information.

It would be appreciated by those skilled in the art that the term "user equipment" includes any appropriate type of wireless user equipment, such as a mobile phone, a portable data processing device, a portable web browser, or on-vehicle mobile station.

In general, multiple embodiments of the present application may be implemented in hardware or a dedicated circuit, software, logic, or any combination thereof. For example, some aspects may be implemented in hardware while other aspects may be implemented in a controller, a microprocessor, or firmware or software executed by other computing devices, although the present application is not limited to the above.

Embodiments of the present application may be implemented by executing computer program instructions by a data processor of a mobile device, for example, in a processor entity, or through hardware, or a combination of software and hardware. The computer program instructions may be assembler instructions, Instruction Set Architecture (ISA) instructions, machine instructions, machine related instructions, microcode, firmware instructions, status setting data, or source code or target code written in any combination of one or more programming languages.

Any one of the block diagrams of logic flowcharts in the drawings may represent program steps, or may represent logic circuits, modules and functions interconnected to one another, or may represent a combination of program steps with logic circuits, modules and functions. Computer programs may be stored on the memory that may be of any suitable type for a local technical environment and may be implemented using any appropriate data storage technique, including, but not limited to, a Read-Only Memory (ROM), a Random Access Memory (RAM), an optical storage device and system (Digital Video Disc (DVD) or Compact Disk (CD)), and the like. The computer readable medium may cover a non-transient storage medium. The data processor may be any suitable type for a local technical environment, including, but not limited to, a general computer, a dedicated computer, a microprocessor, a Digital Signal Processing (DSP), an Application Specific Integrated Circuit (ASIC), a Field-Programmable Gate Array (FPGA), and a multi-core processor architecture-based processor.

What is claimed is:

1. A method for determining a power control parameter, applied at a first communication node, the method comprising:
    determining a beam state for an uplink transmission; and
    determining, based on the beam state, the power control parameter of the uplink transmission,
    wherein the beam state at least comprises a Transmission Configuration Indication (TCI) state, and wherein the determining, based on the beam state, the power control parameter of the uplink transmission comprises:
    determining the power control parameter of the uplink transmission based on an index of the power control parameter comprised in the beam state;
    wherein the uplink transmission is a Sounding Reference Signal (SRS) transmission, and wherein the determining, based on the beam state, the power control parameter of the uplink transmission further comprises:
    determining a power control parameter of any one SRS resource in an SRS resource set, based on a power control parameter associated with a TCI state corresponding to an SRS resource having a lowest index in the SRS resource set.

2. The method of claim 1, wherein the beam state is indicated by information of one of the following:
    an index of at least one beam state in a specific beam state set,
    an index of at least one beam state in activated beam states in the specific beam state set,
    a combined index of at least one beam state in the specific beam state set, or
    a combined index of at least one beam state in activated beam states in the specific beam state set,
    wherein the specific beam state set is configured or activated by at least one of higher layer signaling or Media Access Control (MAC) layer signaling.

3. The method of claim 1, wherein the beam state for the uplink transmission at least comprises one of the following: a beam state referenced by the uplink transmission; a beam state associated with the uplink transmission; a beam state indicated by Downlink Control Information (DCI) scheduling or triggering the uplink transmission; a beam state configured by higher layer signaling for the uplink transmission; or a beam state associated with a resource of the uplink transmission.

4. The method of claim 1, wherein the determining, based on the beam state, the power control parameter of the uplink transmission comprises
    determining the power control parameter of the uplink transmission based on an association between the beam state and the power control parameter.

5. The method of claim 4, wherein the association between the beam state and the power control parameter comprises an association element between at least one beam state and the power control parameter, and
    wherein an association element between the beam state and a power control parameter comprises at least one of the following:
        an index of the association element between the beam state and the power control parameter,
        the beam state index, or
        the power control parameter index.

6. The method of claim 1,
    wherein the power control parameter at least comprises at least one of the following: a path-loss measurement parameter, a target received power, a path-loss compensation factor, or a closed loop power control parameter, and
    wherein the uplink transmission at least comprises one of the following: a Physical Uplink Shared Channel (PUSCH) transmission, a Physical Uplink Control Channel (PUCCH) transmission, a Sounding Reference Signal (SRS) transmission, or a Physical Random Access Channel (PRACH) transmission.

7. The method of claim 1, wherein in a case where the beam state is used for a PUSCH transmission, a PUCCH transmission, and an SRS transmission, the power control parameter at least comprises at least one of the following: a path-loss measurement parameter, a target received power of a PUSCH, a path-loss compensation factor of the PUSCH, a closed loop power control parameter of the PUSCH, a target received power of a PUCCH, a closed loop power control parameter of the PUCCH, a target received power of an SRS, or a closed loop power control parameter of the SRS.

8. The method of claim 1, wherein the beam state comprises at least one of the following: a beam state configured or associated with an SRS resource, a beam state for an uplink transmission, or a beam state non-dedicated to a downlink transmission.

9. The method of claim 1, wherein a path-loss measurement parameter comprised in or associated with the beam state is used to determine a path-loss measurement parameter of at least one of the following uplink transmissions: a PUSCH transmission, a PUCCH transmission, an SRS transmission, or a PRACH transmission.

10. A device comprising a memory and at least one processor,
    the memory being configured to store at least one program,
    the at least one program, when executed by the at least one processor, causing the at least one processor to implement the method of claim 1.

11. A method for determining a power control parameter, applied at a second communication node, the method comprising:
    configuring or activating a specific beam state set; and
    configuring or indicating a beam state associated with an uplink transmission, the beam state associated with the uplink transmission being used for determining the power control parameter of the uplink transmission, wherein determining the power control parameter of the uplink transmission using the beam state associated with the uplink transmission comprises:
        determining the power control parameter of the uplink transmission based on an index of the power control parameter comprised in the beam state,
    wherein the beam state associated with the uplink transmission comprises at least one beam state in the specific beam state set, and
    wherein the beam state at least comprises a Transmission Configuration Indication (TCI) state;
    wherein the uplink transmission is a Sounding Reference Signal (SRS) transmission, and wherein the determining the power control parameter of the uplink transmission using the beam state associated with the uplink transmission further comprises:
    determining a power control parameter of any one SRS resource in an SRS resource set, based on a power control parameter associated with a TCI state corresponding to an SRS resource having a lowest index in the SRS resource set.

12. The method of claim 11, wherein the determining the power control parameter of the uplink transmission using the beam state associated with the uplink transmission comprises: determining the power control parameter of the uplink transmission based on an association between the beam state and the power control parameter.

13. The method of claim 12, wherein the association between the beam state and the power control parameter comprises:
    an association element between at least one beam state and the power control parameter, and
    wherein an association element between the beam state and a power control parameter at least comprises one of the following:
        an index of the association element between the beam state and the power control parameter,
        the beam state index, or
        the power control parameter index.

14. The method of claim 11,
    wherein the power control parameter at least comprises at least one of the following: a path-loss measurement parameter, a target received power, a path-loss compensation factor, or a closed loop power control parameter, and
    wherein the uplink transmission at least comprises one of the following: a Physical Uplink Shared Channel (PUSCH) transmission, a Physical Uplink Control Channel (PUCCH) transmission, a Sounding Reference Signal (SRS) transmission, or a Physical Random Access Channel (PRACH) transmission.

15. The method of claim 11, wherein the beam state is indicated by information of one of the following:
    an index of at least one beam state in a specific beam state set,
    an index of at least one beam state in activated beam states in the specific beam state set,
    a combined index of at least one beam state in the specific beam state set, or
    a combined index of at least one beam state in activated beam states in the specific beam state set,
    wherein the specific beam state set is configured or activated by at least one of higher layer signaling or Media Access Control (MAC) layer signaling.

16. The method of claim 11, wherein in a case where the beam state is used for a PUSCH transmission, a PUCCH transmission, and an SRS transmission, the power control parameter at least comprises at least one of the following: a path-loss measurement parameter, a target received power of a PUSCH, a path-loss compensation factor of the PUSCH, a closed loop power control parameter of the PUSCH, a target received power of a PUCCH, a closed loop power control parameter of the PUCCH, a target received power of an SRS, or a closed loop power control parameter of the SRS.

17. The method of claim 11, wherein the beam state comprises at least one of the following: a beam state configured or associated with an SRS resource, a beam state for an uplink transmission, or a beam state non-dedicated to a downlink transmission.

18. The method of claim 11, wherein a path-loss measurement parameter comprised in or associated with the beam state is used to determine a path-loss measurement parameter of at least one of the following uplink transmissions: a PUSCH transmission, a PUCCH transmission, an SRS transmission, or a PRACH transmission.

19. A device comprising a memory and at least one processor,
   the memory being configured to store at least one program,
   the at least one program, when executed by the at least one processor, causing the at least one processor to implement the method of claim 14.

\* \* \* \* \*